United States Patent
Stark et al.

(10) Patent No.: US 9,641,436 B1
(45) Date of Patent: May 2, 2017

(54) GENERATING A FLOW ID BY PASSING PACKET DATA SERIALLY THROUGH TWO CCT CIRCUITS

(71) Applicant: Netronome Systems, Inc., Santa Clara, CA (US)

(72) Inventors: Gavin J. Stark, Cambridge (GB); Stuart C. Wray, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 152 days.

(21) Appl. No.: 14/726,441

(22) Filed: May 29, 2015

(51) Int. Cl.
*H04L 12/741* (2013.01)
*H04L 29/06* (2006.01)
*H04L 12/721* (2013.01)
*H04L 12/851* (2013.01)

(52) U.S. Cl.
CPC ............ *H04L 45/745* (2013.01); *H04L 45/38* (2013.01); *H04L 47/2441* (2013.01); *H04L 69/22* (2013.01)

(58) Field of Classification Search
None
See application file for complete search history.

(56) References Cited

U.S. PATENT DOCUMENTS

| 9,319,324 | B2* | 4/2016 | Beheshti-Zavareh | ............. H04L 47/2408 |
|---|---|---|---|---|
| 2012/0314709 | A1 | 12/2012 | Post et al. | ..................... 370/392 |
| 2013/0058255 | A1 | 3/2013 | Casado et al. | ................ 370/255 |
| 2013/0148667 | A1* | 6/2013 | Hama | ................. H04L 12/4633 370/400 |
| 2014/0098669 | A1* | 4/2014 | Garg | ....................... H04L 47/12 370/235 |
| 2014/0237118 | A1 | 8/2014 | Matthews | ...................... 709/226 |
| 2014/0241356 | A1* | 8/2014 | Zhang | ..................... H04L 45/38 370/392 |
| 2014/0241361 | A1* | 8/2014 | Bosshart | ................ H04L 45/74 370/392 |
| 2014/0334489 | A1* | 11/2014 | Bosshart | .............. H04L 45/745 370/392 |

(Continued)

OTHER PUBLICATIONS

K. Kannan and S. Banerjee, "Compact TCAM: Flow entry compaction in TCAM for power aware SDN," Apr. 2013.*

(Continued)

*Primary Examiner* — Tejis Daya
(74) *Attorney, Agent, or Firm* — Imperium Patent Works LLP; T. Lester Wallace; Mark D. Marrello

(57) ABSTRACT

An integrated circuit includes an input port, a first Characterize/Classify/Table Lookup and Multiplexer Circuit (CCTC), a second CCTC, and an exact-match flow table structure. The first and second CCTCs are structurally identical. The first and second CCTs are coupled together serially. In one example, an incoming packet is received onto the integrated circuit via the input port and packet information is supplied to a first characterizer of the first CCTC. Information flow passes through the classifier of the first CCT, through the Table Lookup and Multiplexer Circuit (TLMC) of the first CCT, through the characterizer of the second CCT, through the classifier of the second CCT, and out of the TLMC of the second CCT in the form of a Flow Id. The Flow Id is supplied to the exact-match flow table structure to determine whether an exact-match for the Flow Id is found in the flow table structure.

21 Claims, 32 Drawing Sheets

(56) References Cited

U.S. PATENT DOCUMENTS

| | | | | |
|---|---|---|---|---|
| 2015/0016279 A1* | 1/2015 | Zhang | ............... | H04L 45/38 370/250 |
| 2015/0016456 A1* | 1/2015 | Ramanathan | ......... | H04L 45/306 370/392 |
| 2015/0063349 A1* | 3/2015 | Ardalan | ............. | H04L 45/56 370/381 |

OTHER PUBLICATIONS

Lallo et al., "On the Practical Applicability of SDN Research", Apr. 29, 2016.*
"Implementing an OpenFlow Switch on the NetFPGA Platform", by Jan Naous et al., 9 pages (2008).
"Cavium/XPliant CNX880XX Product Brief", by Cavium, Inc., 2 pages (2014).
Broadcom Delivers Industry's First High-Density 25/100 Gigabit Ethernet Switch for Cloud-Scale Networks, PRNewswire, 2 pages (Sep. 24, 2014).
"Implementing OpenFlow Switch Using FPGA Based Platform", by Ting Liu, Master's Thesis, Norwegian University of Science and Technology (Jun. 2014).
"Dell Strikes First, Cuts Deep With Tomahawk Switches", by Timothy Prickett Morgan, The Platform, 3 pages (Apr. 23, 2015).
"DevoFlow: Cost-Effective Flow Management for High Performance Enterprise Networks", by Jeffrey C. Mogul et al., 6 pages (2010).
"Engineered Elephant Flows for Boosting Application Performance in Large-Scale CLOS Networks", Broadcom Corporation, OF-DPA-WP102-R, 14 pages (Mar. 2014).
"Elephant Trap: A Low Cost Device for Identifying Large Flows", by Yi Lu et al., 15th IEEE Symposium on High-Performance Interconnects, 7 pages (2007).
"Using CPU as a Traffic Co-Processing Unit in Commodity Switches", by Guohan Lu et al., ACM978-1-4503-1477-0/12/08, 6 pages (2012).
"Netronome 100GbE NIC Targets SDN", by Bob Wheeler, Networking Report, 3 pages (Apr. 28, 2014).
"Using Hardware Classification to Improve PC-Based OpenFlow Switching", IEEE 12th Intl. Conf. on High Performance Switching and Routing, by V. Tanyingyong, 7 pages (2011).
"OpenFlow Switch Specification", version 1.1.0, 56 pages (Feb. 28, 2011).

* cited by examiner

DATA CENTER

SDN SWITCH
(TOP-OF-RACK SWITCH)

SDN SWITCH
(TOP-OF-RACK)

ONE NFX CIRCUIT

EXACT-MATCH FLOW TABLE STRUCTURE

CHARACTERIZER

| OCTET | RESULT | WIDTH | BITS | DESCRIPTION |
|---|---|---|---|---|
| 0 | TABLE SET | 1 | 0:0 | THE VALUE OF THE "TABLE SET" REGISTER BIT AT THE TIME OF PRESENTATION TO THE PICOENGINE. |
| | SHORT | 1 | 1:1 | INDICATES THE PACKET WAS IN SOME WAY TOO SHORT TO COMPLETE THE DESIRED CHARACTERIZATION. |
| | ERROR | 1 | 2:2 | SET IF A CHARACTERIZATION ERROR OCCURRED. |
| | INNER SHORT | 1 | 3:3 | IF SET, INNER ANALYSIS INDICATED PACKET WAS TOO SHORT FOR ITS INNER PAYLOAD. |
| | USER TYPE | 3 | 6:4 | TAKEN DIRECTLY FROM THE LOGICAL PORT CONFIGURATION. |
| | INNER INCOMPLETE | 1 | 7:7 | SET IF INNER ANALYSIS WAS ATTEMPTED BUT NOT ENOUGH DATA WAS SUPPLIED TO COMPLETE IT (INCOMPLETE IPV4 HEADER, NO BOS IN MPLS, ETC). |
| 1 | OUTER TYPE | 3 | 2:0 | FINAL TYPE OF THE OUTER AND ETHERNET CHARACTERIZATION (BIT 0 INDICATES GFP DONE; BIT 1 INDICATES ETHERNET DONE; BIT 2 INDICATES PPP DONE) |
| | GFP TYPE | 1 | 3:3 | ZERO FOR GFP-F NO EXTENSION, 1 FOR VALID GFP-F WITH LINEAR EXTENSION. |
| | ETH INITIAL TCAM | 1 | 4:4 | IF SET, SKIPPED THE INTIAL TCAM TAG |
| | ETH VLANS | 2 | 6:5 | NUMBER OF VLAN TAGS SKIPPED (0 TO 3) |
| | ETH PBB | 1 | 7:7 | IF SET, THEN ETHERNET PBB WAS ANALYZED |
| 2 | INNER TYPE | 3 | 2:0 | ENCODED INNER PAYLOAD TYPE (0=IPV4, 1=IPV6, 2=MPLS-U, 3=MPLS-M, 4=ARP, 5=FCOE, 6=OTHER) - PRESENTED IN AN 8-BIT FIELD |
| 3 | INNER FLAGS | 8 | 7:0 | FLAGS FROM THE INNER CHARACTERIZATION, SEE THE RELEVANT INNER CHARACTERIZATION SECTION ABOVE |
| 4-7 | PORT | 7 | 31:0 | LOGICAL PORT THAT THE PACKET ARRIVED ON; THIS IS REPLACED BY THE 32-BIT TUNNEL DATA FOR A TUNNELED PACKET MOST SIGNIFICANT BYTE FIRST |
| 8-9 | LENGTH | 16 | 15:0 | PACKET LENGTH FROM MAC (INCLUDES PREPENDS) MOST SIGNIFICANT BYTE FIRST |
| 10-11 | RESERVED | 16 | 15:0 | FIRST 2 OCTETS OF THE ORIGINAL PACKET |
| 12 | OUTER OFFSET | 8 | 7:0 | OFFSET FROM START OF PACKET TO THE OUTER PACKET; THIS IS COPIED FROM THE LOGICAL PORT'S 'SKIP' FIELD OR THE TUNNEL SKIP AMOUNT |
| 13 | ETH PBB | 8 | 7:0 | OFFSET TO ETHERNET FOR GFP-F. THIS IS OUTEROFFSET+8 OR 12 (12 IF EXTENDED) |
| 14 | INNER OFFSET | 8 | 7:0 | OFFSET FROM START OF PACKET TO THE INNER PACKET; ZERO IF INNERTYPE IS OTHER |
| 15 | PAYLOAD OFFSET | 8 | 7:0 | OFFSET FROM START OF PACKET TO THE PAYLOAD OF THE INNER ENCAPSULATION; ZERO IF INNERTYPE IS OTHER |

CHARACTERIZATION VALUE RESULT TABLE

FIG. 9

TEMPLATE RAM

REDUCE TABLE A

ONE SEQUENCE OF INSTRUCTIONS TRAVERSING THROUGH
DIFFERENT PARTS OF DIFFERENT TABLES OF CODE

DATA CENTER IN GREAT DETAIL

OVERLAY NETWORK
(PACKET TYPE B TO PACKET TYPE C)

PACKET TYPE B TO PACKET TYPE C DETUNNELING

OVERLAY NETWORK
(PACKET TYPE C TO PACKET TYPE B)

PACKET TYPE C TO PACKET TYPE B TUNNELING

VXLAN PACKET ENCAPSULATION AND FLOW ROUTING IN A LEAF (TOR SWITCH)

INPUT TO REDUCE TABLE A
(64-BITS)

OUTPUT OF BARREL SHIFTER
(64-BITS)

OUTPUT FROM REDUCE TABLE A
(32-BITS)

INPUT TO REDUCE TABLE B
(64-BITS)

OUTPUT OF BARREL SHIFTER
(64-BITS)

OUTPUT FROM REDUCE TABLE B
(32-BITS)

FLOW ID
(FOR PACKET TYPE C TO PACKET TYPE B CONVERSION EXAMPLE)

ONE FLOW ENTRY STORED IN ONE ENTRY FIELD OF THE FLOW TABLE

BIT-BY-BIT EXACT MATCH USING AN EXACT MATCH FLOW TABLE

BIT-BY-BIT EXACT MATCH USING AN EXACT MATCH FLOW TABLE ON A SINGLE INTEGRATED CIRCUIT

CROSSBAR COMMUNICATION

ONE SET OF HEADER INFORMATION READ OUT OF THE FIRST EGRESS
PACKET MODIFIER MEMORY

ONE SET OF HEADER INFORMATION READ OUT OF THE SECOND EGRESS
PACKET MODIFIER MEMORY

MAC FRAME
(COMMAND MODE)

ONE COMMAND HEADER

| DATA (8 BITS) | OPCODE (7 BITS) | MEANING |
|---|---|---|
| XXYYZZZZ | 0000000 | STRIP THE LEADING COMMAND HEADER AND THEN OUTPUT THE REMAINDER FROM THE EGRESS PORT IDENTIFIED BY THE DATA FIELD. XX = CORNER YY = EGRESS PORT OF THE CORNER |
| XXXXXXXX | 0000100 | ADD A FLOW ENTRY. (THE PAYLOAD CONTAINS THE FLOW ENTRY) |
| XXXXXXXX | 0000101 | DELETE A FLOW ENTRY. (THE FLOW ENTRY IS INDICATED BY THE PAYLOAD) |
| XXXXXXXX | 0000110 | REPORT STATS FOR A FLOW ENTRY. (THE FLOW ENTRY IS INDICATED BY THE PAYLOAD) |
| XXYYZZZZ | 0000111 | SET AN NFX PORT TO OPERATE IN THE COMMAND MODE. (THE PORT IS INDICATED BY THE PAYLOAD) XX = CORNER YY = EGRESS PORT OF THE CORNER |
| XXZZZZZZ | 0001000 | CONFIGURE A PART OF THE NFX. XX = CORNER ZZZZZZ=000000 INDICATES CONFIGURE THE INGRESS MAC BLOCK. THE CONFIGURATION DATA IS CARRIED IN THE PAYLOAD. ZZZZZZ=000001 INDICATES CONFIGURE THE EGRESS MAC BLOCK. THE CONFIGURATION DATA IS CARRIED IN THE PAYLOAD. ZZZZZZ=000010 INDICATES LOAD REDUCE SRAM OF REDUCER A. DATA TO BE LOADED INTO THE MEMORY IS CARRIED IN THE PAYLOAD. ZZZZZZ=000011 INDICATES LOAD REDUCE SRAM OF REDUCER B. DATA TO BE LOADED INTO THE MEMORY IS CARRIED IN THE PAYLOAD. ZZZZZZ=000100 INDICATES LOAD THE EGRESS MODIFIER ARG. MEMORY A. DATA TO BE LOADED INTO THE MEMORY IS CARRIED IN THE PAYLOAD. ZZZZZZ=000101 INDICATES LOAD THE EGRESS MODIFIER ARG. MEMORY B. DATA TO BE LOADED INTO THE MEMORY IS CARRIED IN THE PAYLOAD. ZZZZZZ=000110 INDICATES CONFIGURE THE EGRESS MODIFIER SCRIPT MEMORY. DATA TO BE LOADED INTO THE MEMORY IS CARRIED IN THE PAYLOAD. |

OPCODE OPERATIONS

FIG. 39

GENERATING A FLOW ID BY PASSING PACKET DATA SERIALLY THROUGH TWO CCT CIRCUITS

TECHNICAL FIELD

The described embodiments relate generally to structures and methods for switching packets using a Flow ID and an exact-match flow table.

SUMMARY

In a first novel aspect, an integrated circuit includes an exact-match flow table structure. A Static Random Access Memory (SRAM) within the exact-match flow table structure stores a novel exact-match flow table. The exact-match flow table is a flow table for storing flow entries, where each flow entry includes a Flow Identifier value (Flow Id) and an associated action value. Each Flow Id is a multi-bit digital value, each bit of which is efficiently stored in one and only one cell of the SRAM. The exact-match flow table structure does not, and cannot, store a wildcard bit indictor or mask value. The exact-match flow table structure stores no indicator that any particular part of a packet that should be matched against any particular part of a Flow Id. The Flow Id is not a flow entry of an OpenFlow flow table. The Flow Id uniquely identifies one flow of packets.

In one example, an incoming packet is received onto the integrated circuit and the integrated circuit generates a Flow Id from the incoming packet. The generated Flow Id is supplied to the exact-match flow table structure, and the exact-match flow table structure determines whether the generated Flow Id is a bit-by-bit exact-match of any Flow Id of any flow entry stored in the SRAM. If the determination is that the generated Flow Id is a bit-by-bit exact-match of a Flow Id of a stored flow entry, then the exact-match flow table structure outputs the action value that was stored along with the matching Flow Id. Circuitry on the integrated circuit then performs an action indicated by the action value. In one example, this action is to output the packet from the integrated circuit via an egress port indicated by the action value. The exact-match flow table structure stores at most one Flow Id that can match a Flow Id generated due to the receiving of a legal packet onto the integrated circuit.

If, on the other hand, the determination is that the generated Flow Id is not a bit-by-bit exact-match of any Flow Id of any stored flow entry, then a miss indication communication is output from the integrated circuit. In one example, in a miss situation, the exact-match flow table structure outputs a default action value. The default action value causes the packet to be send out of an egress port indicated by the default action value so that the packet is then communicated from the integrated circuit to a Network Flow Processor (NFP) integrated circuit. The packet is communicated from the integrated circuit to the NFP in encapsulated form. The NFP receives the packet, and determines how it wants the integrated circuit to handle other packets of this flow. In one example, the NFP sends a command communication back to the integrated circuit, where the command communication includes a new Flow Id. The command is a command to the integrated circuit to load the new Flow Id into the exact-match flow table. Thereafter, a subsequent packet of the same flow is received onto the integrated circuit. The integrated circuit goes through the Flow Id generating process and generates a Flow Id for the subsequent packet. The Flow Id is presented to the exact-match flow table, but now there is a bit-by-bit matching Flow Id stored in the exact-match flow table. The action indicated by the action value of the matching flow entry is then carried out. In one example, the action is to output from the second packet from integrated circuit on a particular output port of the integrated circuit. In this way, subsequent packets of the flow will be output by the integrated circuit in accordance with the action value of the newly added flow entry. An action value can be an action to encapsulate an incoming packet or packet information, in addition to sending the encapsulated packet out of a particular egress port.

In a second novel aspect, a Flow Id is generated using a novel multiplexer circuit. In one example, the multiplexer circuit includes a plurality of byte-wide multiplexer circuits. Each byte-wide multiplexer circuit has a plurality of sets of input leads, a set of select input leads, and a set of output leads. A first of the byte-wide multiplexer circuits outputs a byte that is the first byte of the Flow Id, a second of the byte-wide multiplexer circuits outputs a byte that is the second byte of the Flow Id, a third of the byte-wide multiplexer circuits outputs a byte that is the third byte of the Flow Id, and so forth. Each respective set of input leads of each byte-wide multiplexer circuit is coupled to receive a corresponding respective byte of the incoming packet, or other data, or other modified or compressed packet data. By controlling the select values supplied onto the set of select input leads of a byte-wide multiplexer circuit, the byte-wide multiplexer circuit is made to select an appropriate byte (of incoming packet data, or other data, or modified or compressed packet data). In one novel method, a packet is received onto an input port of the integrated circuit. A characterizer and classifier analyzes the packet and classifies the packet as being in one of a plurality of classes. If the incoming packet is determined to be in a first class then the byte-wide multiplexer circuits are controlled in a first way such that a first set of selected bytes is output by the multiplexer circuit in a particular byte order. The bytes output by the multiplexer circuit are a Flow Id. If, however, if the incoming packet is determined to be in a second class then the byte-wide multiplexer circuits are controlled in a second way such that a second set of selected bytes is output by the multiplexer circuit in a particular byte order. The bytes output by the multiplexer circuit are a Flow Id. The generated Flow Id (which is generated in a selected way of a plurality of ways, as determined by the type of the packet) is supplied from the multiplexer circuit and to the exact-match flow table structure.

In a third novel aspect, a Flow Id is generated using a programmable reduce table circuit. An incoming packet is received onto the integrated circuit that includes the exact-match flow table structure. A Flow Id is generated from the packet by using a selected subset of bits of the incoming packet as address bits to address a reduce table SRAM, such that the reduce table SRAM outputs a multi-bit data value. A barrel shifter and mask circuit and adder circuit are used, in one example, to generate the bits that are supplied as the address to the reduce table SRAM. The multi-bit data value that is output from the reduce table SRAM is supplied to a programmable lookup circuit, that in turn performs a selected one of a plurality of lookup operations, and outputs a lookup result value. The lookup result is of a reduced number of bits. A multiplexer circuit (for example, a multiplexer circuit involving a plurality of byte-wide multiplexer circuits as set forth above) receives the lookup result value and outputs at least a part of the lookup result value so that at least a part of the result value is a part of a Flow Id output by the multiplexer circuit. In one example, output leads of the lookup circuit supply one or more bytes onto a particular one or more of the sets of input leads of the multiplexer circuit. By appropriate control of the select input leads of the multiplexer circuit, the multiplexer circuit is made to output a part or all of the lookup result value as part of the Flow Id. In one example, the programmable lookup circuit is controlled to perform a first type of lookup operation if the incoming packet is determined to be of a first type, whereas the programmable lookup circuit is controlled to perform a second type of lookup operation if the incoming packet is determined to be of a second type. In a similar way, an incoming packet can be determined to be of one of three or more types, and the programmable lookup circuit can be controlled to carry out a selected one of three or more lookup operations. In another example, an additional novel template SRAM is provided. The template SRAM receives a template value from the classifier, and outputs bits that control how the reduce table SRAM is addressed, which lookup operation will be performed by the programmable lookup circuit, and how the select input of the multiplexer circuit will be controlled.

In a fourth novel aspect, an integrated circuit that has an exact-match flow table structure also has a crossbar switch, a script-based egress packet modifier, en egress packet script memory, a first egress packet modifier memory, and a second egress packet memory. The egress packet script memory stores a plurality of scripts. The first egress packet modifier memory stores non-flow specific header information. The second egress packet modifier memory stores flow specific header information. In one novel method, a packet is received onto the integrated circuit and a Flow Id is generated from the packet as described above. The Flow Id is supplied to an exact-match flow table structure as described above, and an exact-match is found. The flow entry for which the Flow Id is a bit-by-bit exact-match includes, in addition to the Flow Id, an egress action value, an egress flow number, and an egress port number. The egress action value and the egress flow number are then communicated across the crossbar switch along with a portion (not all) of the packet. The egress action value, the egress flow number and the portion of the packet are received from the crossbar switch and onto the script-based egress packet modifier. The script-based egress packet modifier uses the egress action value to retrieve an indicated script from the egress packet script memory. A script interpreter of the egress packet modifier interprets the script. Interpreting of the script causes the egress packet modifier to retrieve non-flow specific header information from the first egress packet modifier memory. In addition, the egress packet modifier uses the egress flow number to retrieve flow specific header information from the second egress packet modifier memory. The egress packet modifier adds the non-flow specific header information and the flow specific header information onto the front of the portion of the packet, thereby recreating appropriate header fields, and thereby generating a complete output packet. The output packet is then output from the integrated circuit via the particular egress port indicated by the egress port number. By storing the non-flow specific and flow specific information in memories local to the egress packet modifier, and by not sending this header information across the crossbar switch with the packet, the amount of switching and congestion occurring in the crossbar switch is reduced, and power consumption in the crossbar switch is reduced. By storing the non-flow specific and the flow specific header information in different memories, the total amount of memory required to store the necessary header information is reduced as compared to using a single memory in a conventional manner. One reason for including the crossbar switch is to facilitate scaling larger integrated circuits from subcircuits (e.g. an NFX integrate circuit).

In a fifth novel aspect, an integrated circuit includes an exact-match flow table structure and a processor. In one example, the processor is a very small and efficient run-to-completion picoengine processor that does not include an instruction counter and that does not fetch instructions unless it is external prompted to do so. A first packet is received onto the integrated circuit and is analyzed and is determined to be of a first type. As a result of this determination, execution by the processor of a first sequence of instructions is initiated. Execution of the first sequence causes bits of the first packet to be concatenated and modified in a first way thereby generating a first Flow Id of a first form. The first Flow Id of the first form is a bit-by-bit exact-match of a Flow Id of a first flow entry stored in the exact-match flow table maintained in the exact-match flow table structure. The first packet is output from the integrated circuit in accordance with an action value of the matching first flow entry. A second packet is received onto the integrated circuit and is analyzed and is determined to be of a second type. As a result of this determination, execution by the processor of a second sequence of instruction is initiated. Execution of the second sequence causes bits of the second packet to be concatenated and modified in a second way thereby generating a second Flow Id of a second form. The second Flow Id of the second form is a bit-by-bit exact-match of a Flow Id of a second flow entry stored in the exact-match flow table. The second packet is output from the integrated circuit in accordance with an action value of the matching second flow entry. In one example, execution by the picoengine processor of the first sequence causes a programmable lookup circuit and a multiplexer circuit to be controlled in a first way so that a Flow Id of a first form is generated, whereas execution by the picoengine processor of the second sequence causes a programmable lookup circuit and a multiplexer circuit to be controlled in a second way so that a Flow Id of a second form. The exact-match flow table structure can store and match to Flow Id of both forms.

In a sixth novel aspect, an integrated circuit comprises an input port, a first characterize/Classify/Table Lookup and Multiplexer Circuit (CCTC), a second CCTC, and an exact-match flow table structure. The second CCTC is substantially structurally identical to the first CCTC. The first CCT and the second CCTC are coupled together serially so that packet information flows serially from the input port, through the first CCTC, through the second CCTC, and to the exact-match flow table structure. In one example, an incoming packet is received onto the integrated circuit via the input port. A first characterizer of the first CCTC receives the incoming packet and outputs a characterization output value. A first classifier of the first CCTC receives the characterization output value and generates a data output value and a control information value. A first Table Lookup and Multiplexer Circuit (TLMC) of the first CCTC is coupled to receive the data output value and the control information value from the first classifier. A programmable lookup circuit of the first TLMC is controllable to receive a selectable part of the data output value and to output an associated lookup value. A multiplexer circuit of the first TLMC is controllable to output the lookup value as a part of a data output value. The second CCTC includes a second characterizer, a second classifier, and a second TLMC. The second characterizer of the second CCTC receives at least a part of the data output value that is output by the first TLMC. The second classifier is coupled to receive a characterization output value from the second characterizer. The second TLMC is coupled to receive the data output value from the second classifier and to receive a control information value from the second classifier. A programmable lookup circuit of the second TLMC is controllable to receive a selectable part of the data output value received from the second classifier and to output an associated lookup value. A multiplexer circuit of the second CCTC is controllable to output the lookup value as a part of a Flow Id. The Flow Id as output by the second CCTC is supplied to the exact-match flow table structure, which in turn determines whether any Flow Id of any flow entry stored in the exact-match flow table structure is a bit-by-bit exact-match of the Flow Id as output by the second CCTC.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a table illustrating the contents of the characterization result.

FIG. 39 is a table that sets forth the various opcodes possible in a command header.

DETAILED DESCRIPTION

Reference will now be made in detail to background examples and some embodiments of the invention, examples of which are illustrated in the accompanying drawings.

Figure 1:
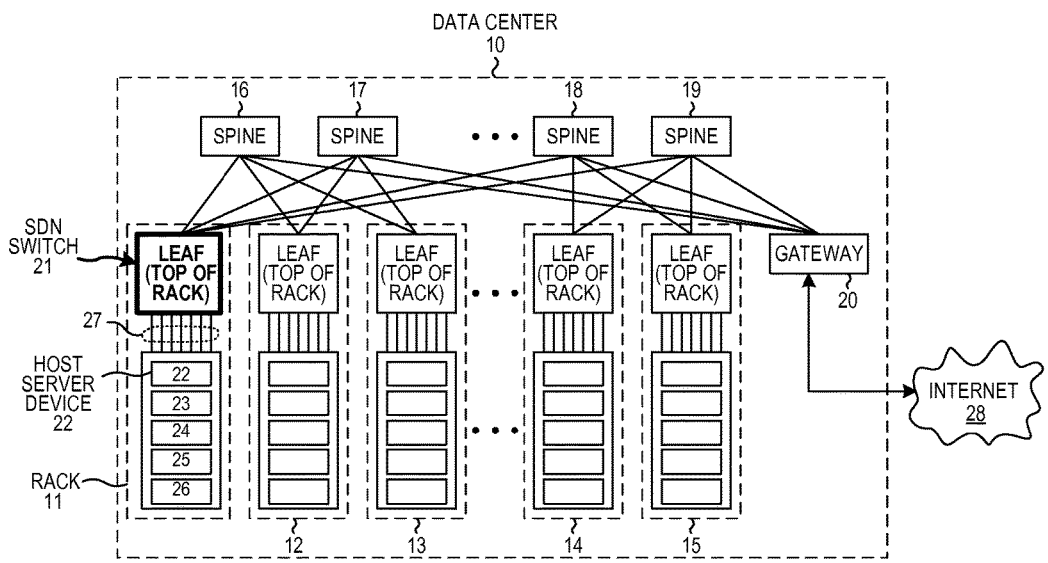
FIG. 1 is a diagram of a data center in accordance with one novel aspect.

FIG. 1 is a diagram of a system commonly referred to as a "data center" 10. Data center 10 in this example includes multiple racks 11-15 of networking devices, multiple spines 16-19, and a gateway device 20. External internet traffic from and to the internet 28 enters and exits the data center via the gateway device 20. For purposes of switching packets within the data center, the gateway may add a tag onto each packet as the packet enters the data center. The tags are used internally within the data center in accordance with an SDN (Software-Defined Networking) protocol. The gateway strips the tags off the packets when the packets leave the data center.

Figure 2:
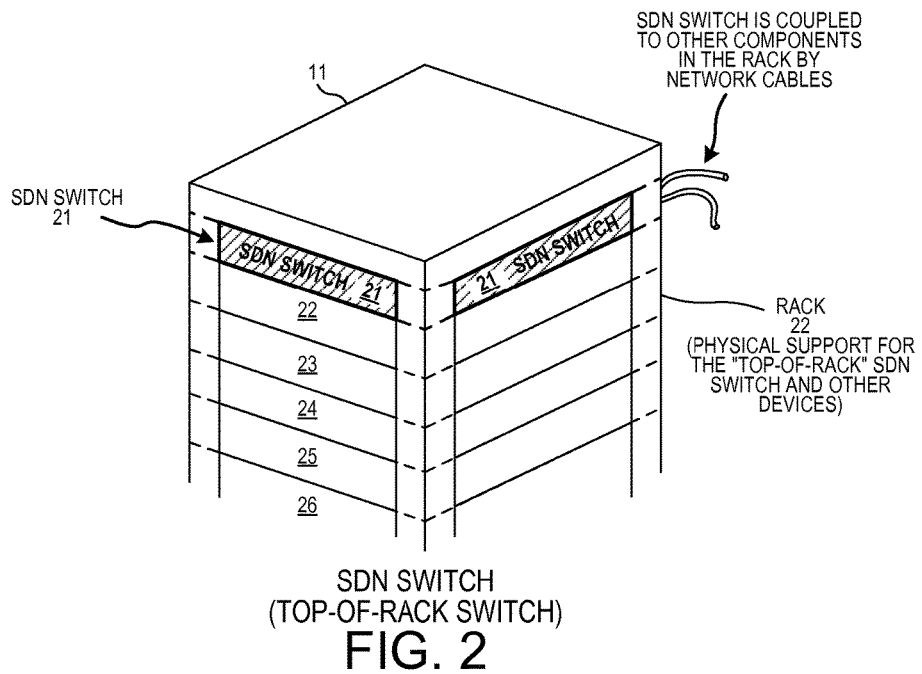
FIG. 2 is a diagram of a rack of network devices within the data center of FIG. 3.

FIG. 2 is a more detailed diagram of one of the racks 11 of FIG. 1. The rack 11 is a physical support structure that holds a stack of rectangularly-shaped networking devices. The upper networking device is a SDN switch 21 referred to a "top-of-rack" switch or "leaf". Although the SDN switch 21 is referred to as a "top-of-rack" switch, the SDN switch that performs this function and that is interconnected in this way need not actually be located in the uppermost slot. The SDN switch 21 involves a set of printed circuit boards and an associated interconnect backplane that are disposed in a rectangular box-like enclosure. The SDN switch 21 slides into the uppermost slot in the rack and is held in place and is physically supported by the rack. Multiple host server devices 22-26 are also held by the rack in slot positions below the top-of-rack switch. The top-of-rack switch 21 is coupled to each of the host server devices 22-26 by networking cables. A networking cable has a first plug that on one end of the cable plugs into a network port socket located on the back of the SDN switch 21 and also has a second plug that on the other end of the cable plugs into a network port socket located on the back of one of the server devices. The cable plugs and sockets are not illustrated in FIG. 2. As shown in FIG. 1, the top-of-rack SDN switches of the data center are typically not coupled directly to one another by network cables, but rather they may communicate with each other via appropriate ones of the spines as illustrated. The vertical lines 27 illustrated in FIG. 1 represent many networking cables that link the top-of-rack SDN switch 21 to the various server devices 22-26 of the same rack. Each of the racks of components is of the same structure.

Figure 3:
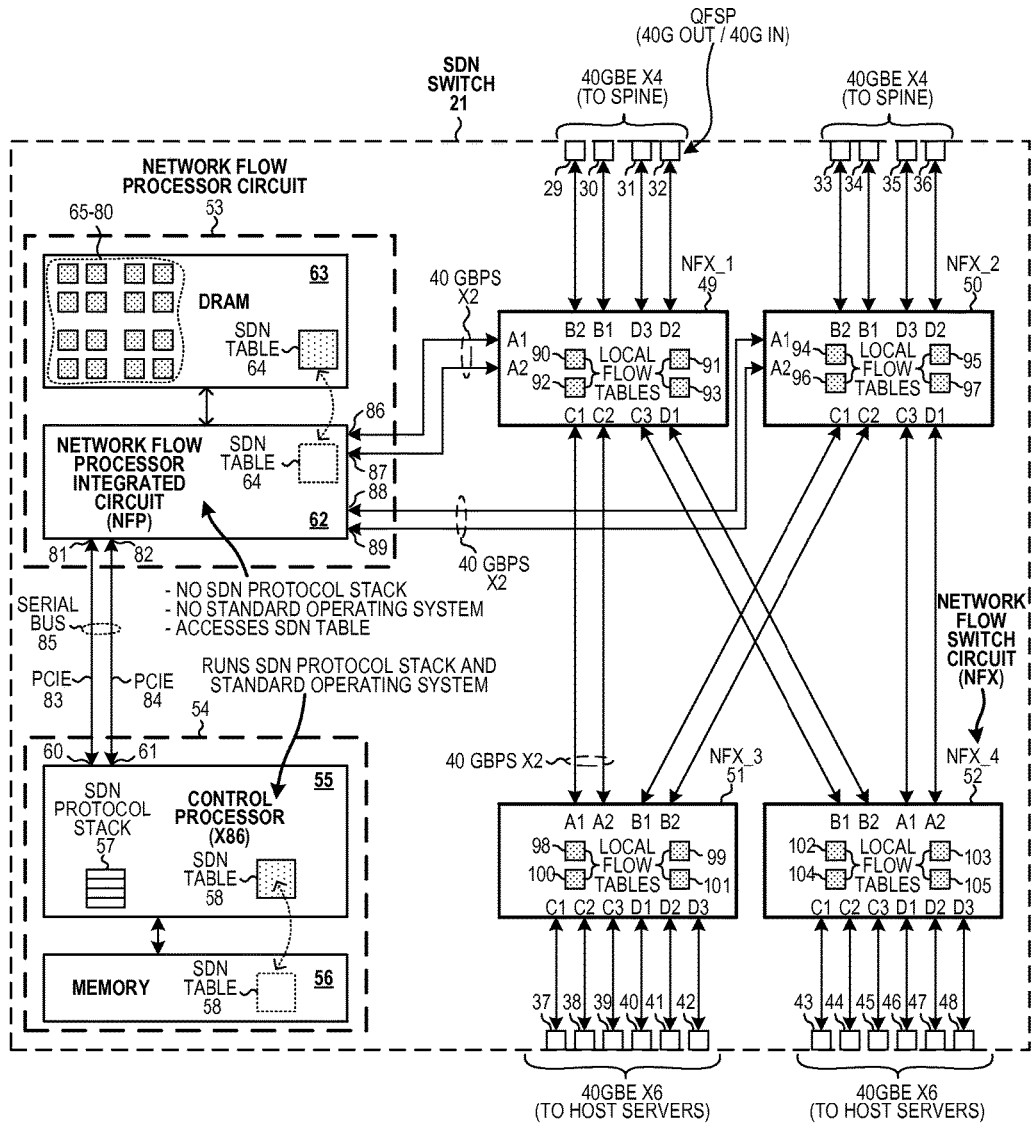
FIG. 3 is a block diagram of an SDN switch in the rack of FIG. 2.

FIG. 3 is a more detailed diagram of SDN switch 21. SDN switch 21 includes a plurality of QSFP 40 Gbps modules 29-48, four Network Flow Switch (NFX) circuits 49-52, a Network Flow Processor (NFP) circuit 53, and a control processor circuit 54. These electronic components are disposed on a set of printed circuit boards. The printed circuit boards are interconnected by a backplane. The printed circuit boards and the backplane are disposed in a box-like enclosure.

Each QSFP module has a socket for receiving a plug. The QFSP modules are disposed on the printed circuit boards so that the sockets are accessible from outside the enclosure. Each QSFP module provides transceivers for four outgoing optical fibers, and for four incoming optical fibers. Each optical fiber provides 10 Gbps communication, so the overall QSFP module provides 40 Gbps communication in both directions. The eight optical fibers are parts of a single optical cable that has plugs on either end to plug into QSFP modules sockets.

Control processor circuit 54 is a processor system that includes, among other parts not illustrated, a control processor integrated circuit 55 and an amount of memory 56. The control processor integrated circuit 55 in one example is a CPU processor integrated circuit such as an x86-architecture processor that runs a standard operating system, and that has PCIe bus interfaces 60 and 61 for communicating with other devices that have PCIe communication capabilities. A SDN protocol stack 57 is a part of, or is executing on, the operating system. In addition, the control processor circuit 54 stores an SDN flow table 58. The SDN flow table 58 is stored in a combination of the memory 56 and the processor 55. In the present example, the SDN protocol stack 57 is an OpenFlow protocol stack that is compliant with the OpenFlow Switch Specification, version 1.1.0, Implemented (Feb. 28, 2011). The OpenFlow protocol stack 57 causes OpenFlow flow entries to be added into, and to be deleted from, the SDN flow table 58. The OpenFlow protocol stack 57 can receive and handle OpenFlow compliant messages. The OpenFlow protocol stack also generates and outputs OpenFlow messages in accordance with the OpenFlow standard.

Network Flow Processor (NFP) circuit 53 is a processor system that includes, among other parts not illustrated, a NFP integrated circuit 62 and an amount of external memory 63. Of importance, the NFP circuit 53 does not execute any standard operating system, and the NFP circuit 53 does not execute any SDN protocol stack. In the specific example set forth here, the NFP integrated circuit 62 is an instance of the Island-Based Network Flow Processor integrated circuit set forth in U.S. patent application Ser. No. 13/399,888, entitled "Island-Based Network Flow Processor Integrated Circuit", filed Feb. 17, 2012, by Gavin J. Stark et al. (the subject matter of which is incorporated herein by reference). Although the NFP circuit 53 does not execute an SDN protocol stack, and does not execute any standard operating system of the type that would typically support an Open-Flow protocol stack, the NFP circuit 53 does maintain a copy of the SDN table 58. The copy of the SDN table 58 maintained by the NFP circuit 53 is identified by reference numeral 64. In addition, that NFP circuit 53 maintains a copy of a set of sixteen non-SDN flow tables 65-80. The NFP integrated circuit 62 has PCIe bus interfaces 81 and 82. Lines 83 and 84 represent a PCIe serial bus 85 that couples the control processor circuit 54 and the NFP circuit 53.

In addition to PCIe bus interfaces, the NFP integrated circuit 62 also has a set of network ports 86-89. Each of these network ports is a 40 Gbps bidirectional ethernet network port. The ingress portion of the port involves SerDes circuits and an instance of the ingress MAC island as set forth in U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference). The egress portion of the port involves an instance of the egress MAC island and the associated SerDes circuits. A flow can contain a subflow. A flow and a subflow are both considered a flow.

Each of the four Network Flow Switch (NFX) circuits is identical to the others. In the example set forth here, an NFX circuit is an integrated circuit that has twelve network ports denotes A1, A2, A3, B1, B2, B3 C1, C2, C3, D1, D2 and D3. In the diagram of FIG. 3, two of the network ports, namely ports A3 and B3, are not used or connected to, so these ports are not illustrated. Each of the network ports is a 40 Gbps directional ethernet MAC port of the same structure and operation as ports 86-89 of the NFP integrated circuit 53, except that the ingress portions of the network ports of the NFX circuits have an additional capability to handle special command packets as set forth in further detail below. Of importance, none of the NFX circuits 49-52 stores or maintains any SDN flow table, but rather the flow tables maintained by and stored on the NFX circuit are novel and special non-SDN flow tables. The upper-left four flow tables 65-68 on the NFP circuit 53 are copies of the four non-SDN flow tables 90-93 stored in NFX circuit 49. The upper-right four flow tables 69-72 on the NFP circuit 53 are copies of the four non-SDN flow tables 94-97 stored in NFX circuit 50. The lower-left four flow tables 73-76 on the NFP circuit 53 are copies of the four non-SDN flow tables 98-101 stored in NFX circuit 51. The lower-right four flow tables 77-80 on the NFP circuit 53 are copies of the four non-SDN flow tables 102-105 stored in NFX circuit 52. None of the NFX circuits executes any operating system, and none of the NFX circuits has any instruction-fetching processor that fetches instructions, that has an instruction counter, and that analyzes any packet. Compared to the relatively large and powerful and complex master NFP integrated circuit 62 that may bring instruction-fetching processors to bear on analyzing packets, the NFX circuits 49-52 are small and relatively inexpensive slave switching circuits that perform directed switching functions on behalf of the NFP circuit.

Figure 4:
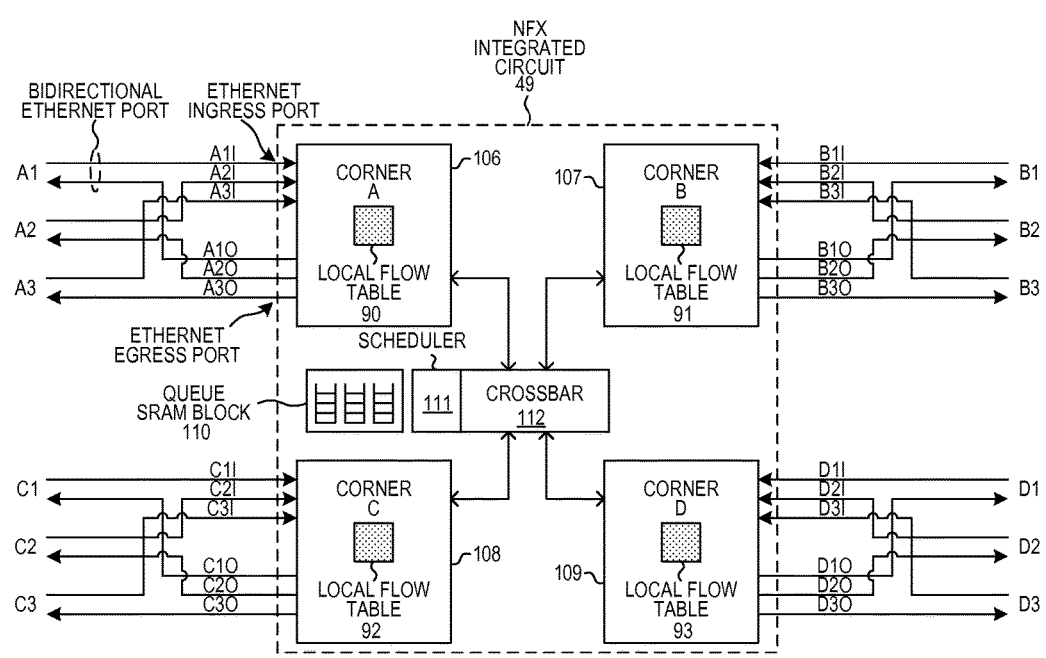
FIG. 4 is a block diagram of one of the NFX circuits in the SDN switch of FIG. 3.

FIG. 4 is a more detailed diagram of NFX integrated circuit 49. The NFX integrated circuit 49 is not included on a larger Network Flow Processor (NFP) integrated circuit and is much less expensive to manufacture than the cost to manufacture a NFP integrated circuit. As set forth above, all of the NFX circuits are identical integrated circuits in this example. NFX integrated circuit 49 includes four corner portions 106-109 (denoted Corner A, Corner B, Corner C, and Corner D), a queue SRAM block 110, a scheduler 111, and a central crossbar switch circuit 112. Each corner portion stores its own non-SDN flow table as illustrated. Each corner portion has three 40 Gbps ethernet MAC ingress ports and three 40 Gbps ethernet MAC egress ports. For Corner A (106), the three ingress ports are denoted A1I, A2I and A3I, and the four egress ports are denoted A1O, A2O and A3O. Packet traffic coming into the NFX circuit is received via one of the ingress ports of a corner, and is communicated to the crossbar switch circuit 112, and then if appropriate is switched to exit the NFX circuit via an egress port of one of the corner portions. The crossbar switch circuit 112 direct the packet to the appropriate corner portion from which the packet will exit the NFX circuit.

In the specific embodiment of FIG. 4, the NFX integrated circuit 49 does not include any openflow flow tables and the NFX integrated circuit 49 does not include any flow tables that include wildcards. The NFX integrated circuit 49 never decides that a new flow entry is to be added to the flow table, the decision/instruction to load a new flow entry into the flow table is always received from an external integrated circuit and the exact flow entry to load into the flow table is generated an external integrated circuit. The NFX integrated circuit 49 only responds to external commands to load a new flow entry into the flow table. However, operation of the exact-match flow table in the NFX integrated circuit 49 is consistent with a higher level openflow table that is not stored on the NFX integrated circuit 49 (e.g. a NFP integrated circuit).

For additional information on NFX circuit 49, see: U.S. Patent Application Serial Numbers: 1) Ser. No. 14/634,844, entitled "A MODULAR AND PARTITIONED SDN SWITCH", 2) Ser. No. 14/634,845, entitled "METHOD OF HANDLING SDN PROTOCOL MESSAGES IN A MODULAR AND PARTITIONED SDN SWITCH", 3) Ser. No. 14/634,847, entitled "FORWARDING MESSAGES WITHIN A SWITCH FABRIC OF AN SDN SWITCH", 4) Ser. No. 14/634,848, entitled "METHOD OF DETECTING LARGE FLOWS WITHIN A SWITCH FABRIC OF AN SDN SWITCH", 5) Ser. No. 14/634,849, entitled "METHOD OF GENERATING SUBFLOW ENTRIES IN AN SDN SWITCH", and 6) Ser. No. 14/634,851, entitled "SDN PROTOCOL MESSAGE HANDLING WITHIN A MODULAR AND PARTITIONED SDN SWITCH", all of which were filed Mar. 1, 2015, by Gavin J. Stark, et. al (the subject matter of which is incorporated herein by reference).

Figure 5:
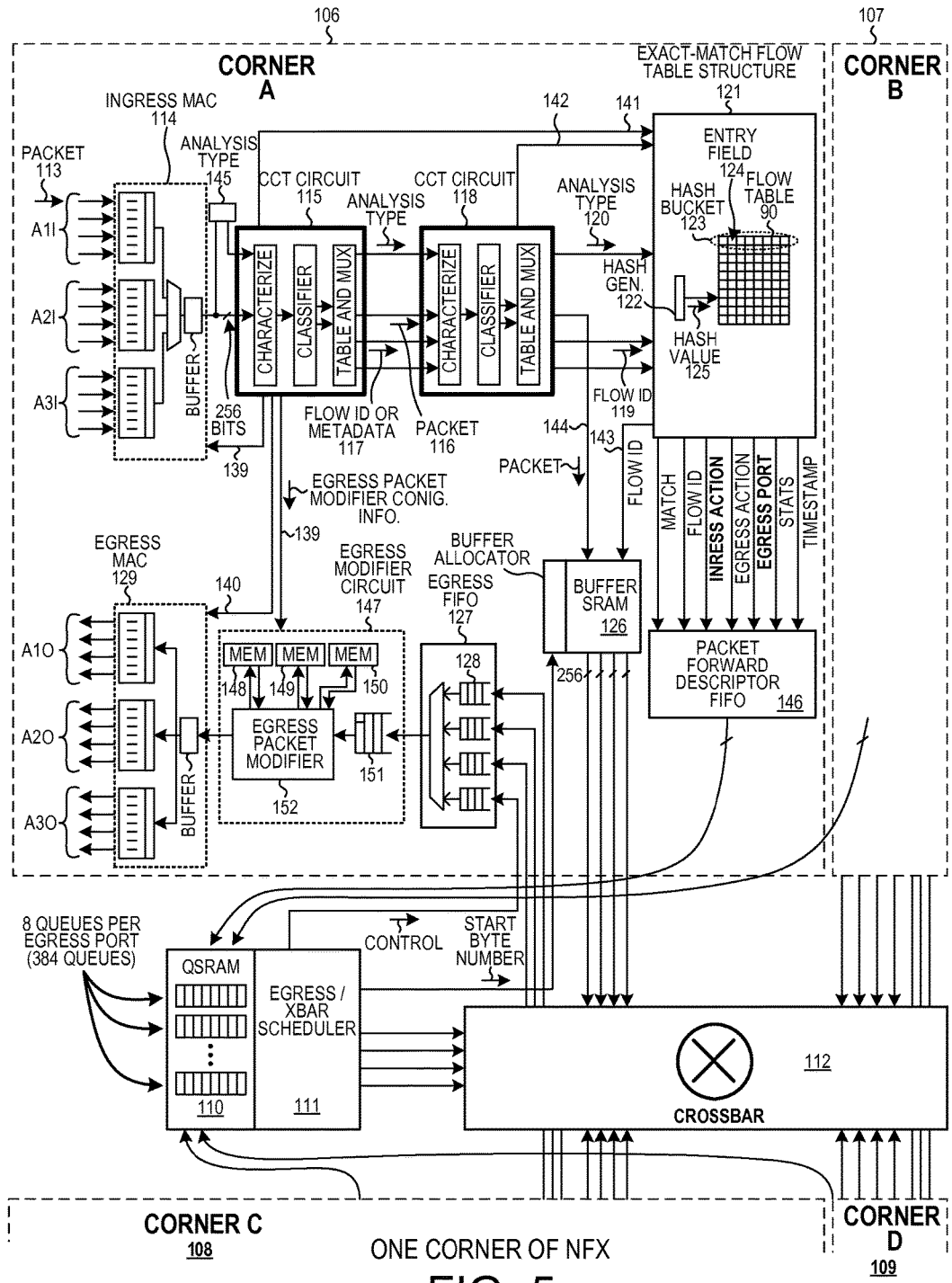
FIG. 5 is a more detailed diagram of one of the corner portions of the NFX circuit of FIG. 4.

FIG. 5 is a more detailed diagram of Corner A (106) of the NFX circuit 49 of FIG. 4. The circuitry of each of the four corner portions of the NFX circuit 49 is identical to the circuitry of each other corner portion. An incoming packet 113 is received onto one of the ingress ports by ingress MAC circuit 114. For additional information on ingress MAC circuit 114, see: U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference).

Figure 7:
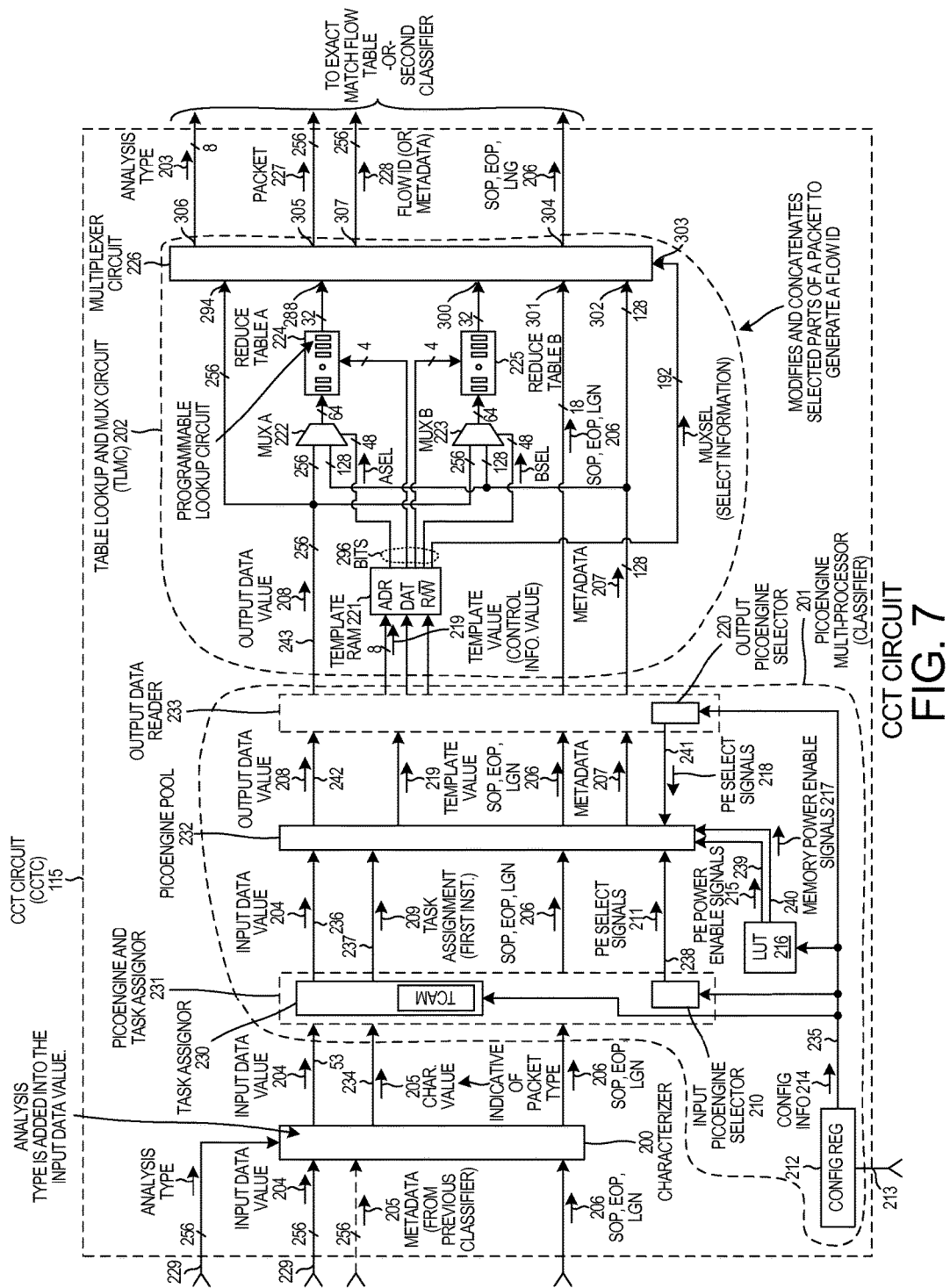
FIG. 7 is a more detailed diagram of Characterize/Classify/Table Lookup and Mux (CCT) circuit 115 of FIG. 5.

In one specific example, each corner of the NFX includes two Characterize/Classify/Table Lookup and Mux circuits (CCTC) 115 and 116 and an analysis type RAM 145. In one embodiment, analysis type RAM 145 is a lookup memory. The output of ingress MAC 114 is provided to analysis type RAM 145 and CCT circuit 115. In response analysis type RAM 145 outputs an analysis type value. The analysis type value determines the type of analysis to be performed by the characterizer included in CCT circuit 115. In one novel aspect, the analysis type value is a 2-bit value that configures the CCT circuit to perform characterization of a specific type of packet that is known to be received on a specific port number. In one example, the analysis type RAM 145 is programmed by another integrated circuit. CCT circuits 115 and 116 are identical circuits. CCT circuit 115 is shown in greater detail in FIG. 7. CCT circuit 115 includes a characterizer circuit 200, a classifier circuit 201, and a table lookup and muxcircuit 202. Characterizer 200 receives is analysis type 203 from analysis type RAM 145, and input data value 204 from ingress MAC 114, metadata 205 from a previous classifier (not applicable to CCT circuit 115), and start of packet—end packet—length of packet data 206 from ingress Mac 114. The characterizer outputs the input data value 204, a characterization value 205, and the start of packet—and packet—length of packet data 206 to classifier 201.

Figure 8:
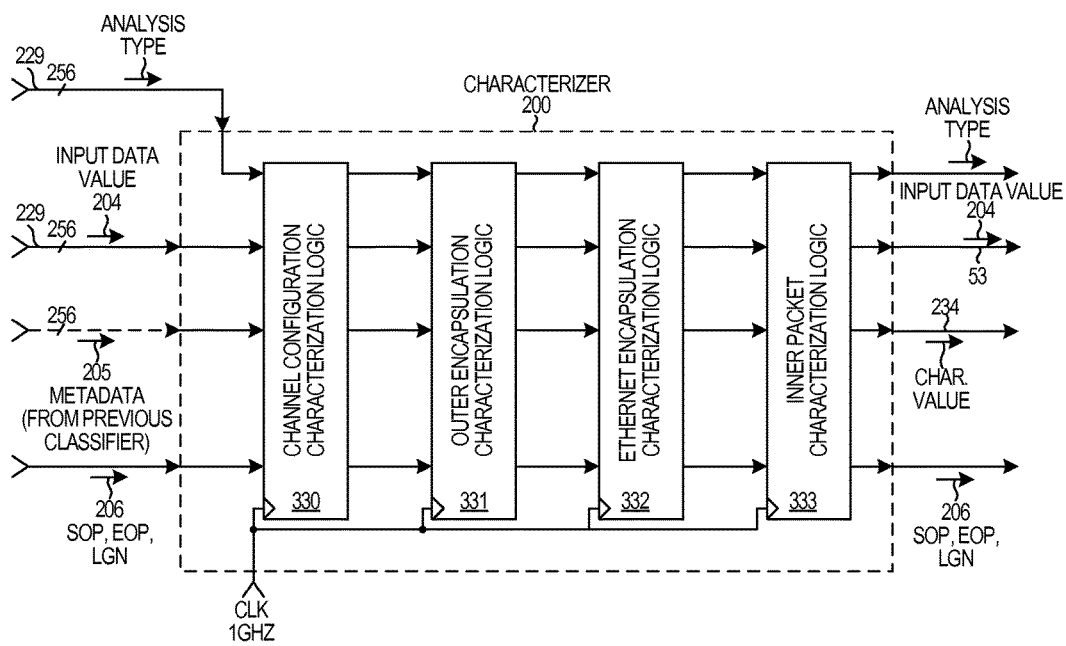
FIG. 8 is a more detailed diagram of characterizer 200.
Figure 10:
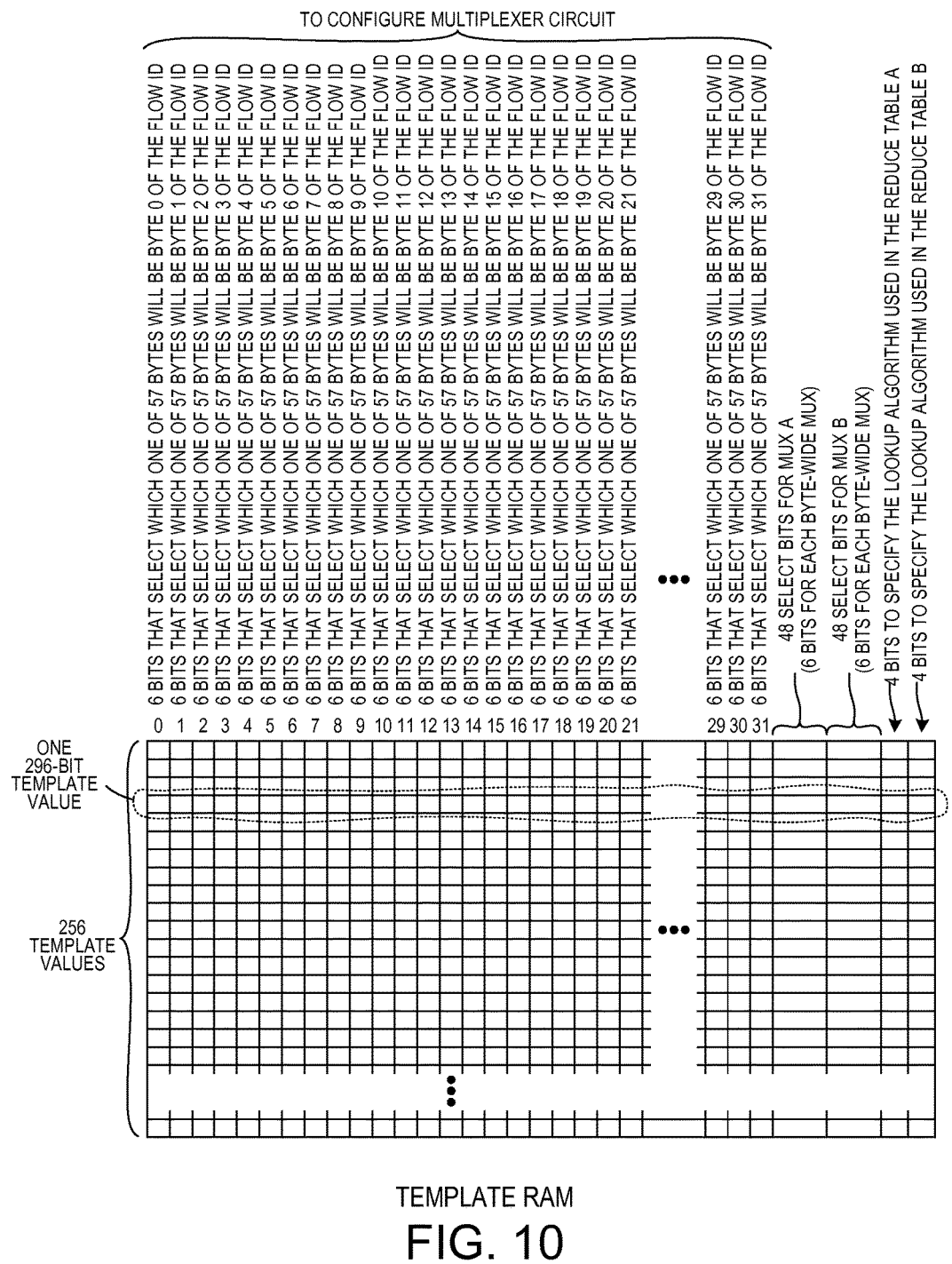
FIG. 10 is a diagram of the contents of template RAM 221.

FIG. 8 illustrates the characterizer 200 in greater detail. The characterizer combines the analysis type value and the input data value (256 bits of an incoming packet) and generates a characterization of the packet (characterization data). The analysis type is configured on a logical channel basis, that is, every logical channel can be assigned a different analysis type value to be used by the characterizer. The analysis type value indicates the first level of characterization required for the packet. The characterizer 200 includes four characterization stages: a channel configuration characterization stage 330, an outer encapsulation characterization stage 331, an ethernet encapsulation characterization stage 332, and an inner packet characterization stage 333. The channel configuration characterization stage 330 performs packet characterization based on channel information. Based on the channel number, the channel configuration characterization stage determines: (i) the amount of 16-bit quantities to skip at the start of the packet to get to the true start of the packet (skips any MAC prepend or external switch prepend); and (ii) determines whether the packet is required to have General Framing Procedure (GFP) framing, Point-to-Point Protocol (PPP) framing, or Ethernet framing. The outer encapsulation characterization stage 331 performs packet characterization based on the framing type determines by the stage 330. Based on the framing type determined in stage 330, the outer encapsulation characterization stage 331 generates: (i) an Ethernet encapsulation type and a start offset of the Ethernet packet; or (ii) an inner packet type and a starting offset into the packet of the inner packet (e.g. IPv4 at starting offset 14). Ethernet encapsulation characterization stage 332 performs Ethernet characterization if the previous stages indicate that the packet is an ethernet packet. Stage 332 can skip various field types and VLAN tags included in the packet. Stage 322 generates information regarding the Ethernet encapsulation, the inner packet type, and a starting offset into the packet of the inner packet. The inner packet characterization stage 333 characterizes the inner packet depending on the inner packet type determined by the outer encapsulation characterization stage 331 or the Ethernet capsulation characterization stage 332. The inner packet characterization stage 333 generates information about the inner packet header, and an indication of the starting offset of the payload encapsulated within the inner packet. The characterization values resulting from characterizer 200 are illustrated in FIG. 10. In this fashion, characterizer 200 is utilized to perform a first level of packet characterization in high speed combinational logic. A second level of packet classification is performed by classifier 201. The characterization value is communicated to a picoengine in the picoengine pool included in the classifier 201.

Figure 14:
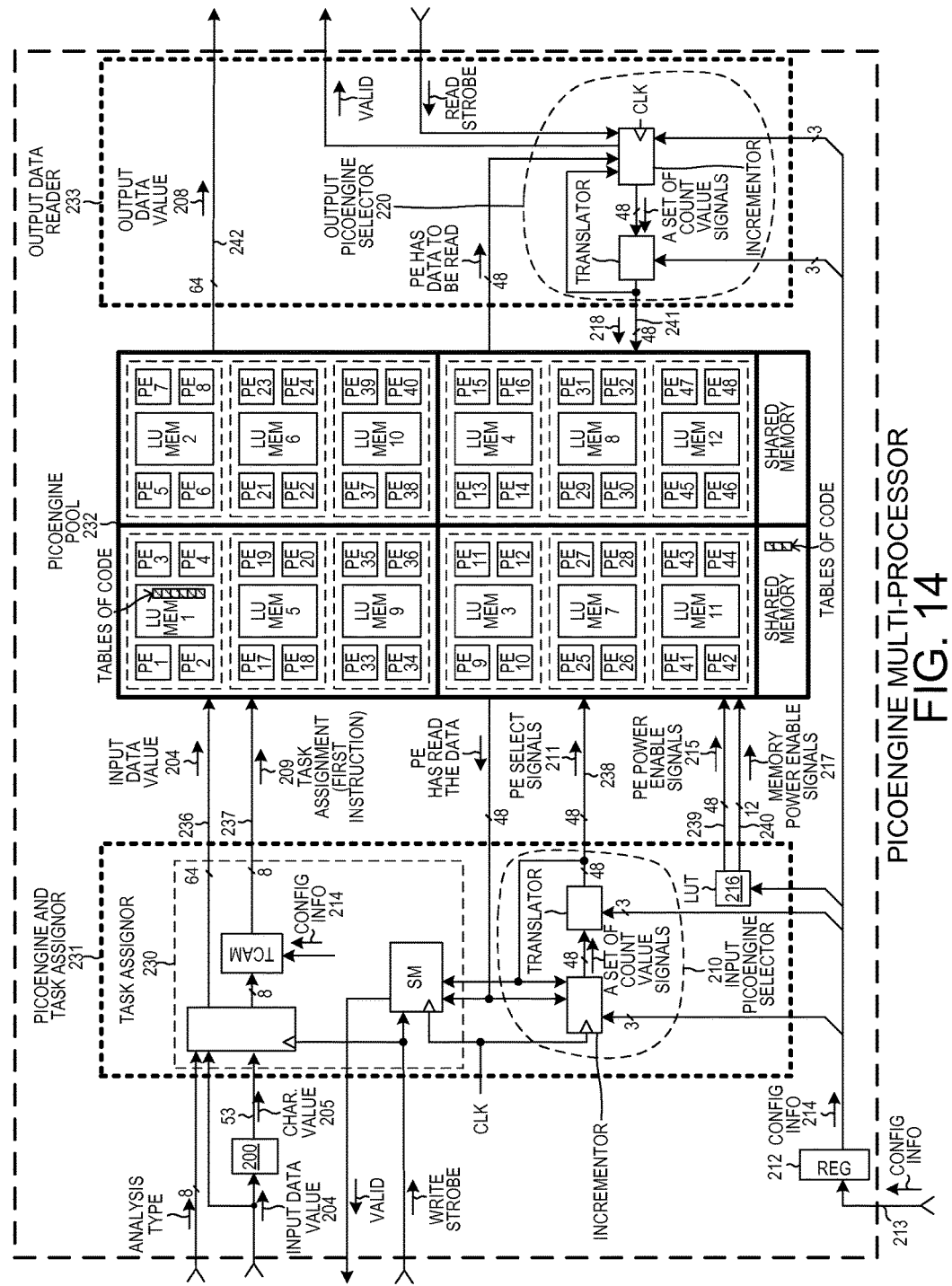
FIG. 14 is a more detailed diagram of a picoengine pool.
Figure 15:
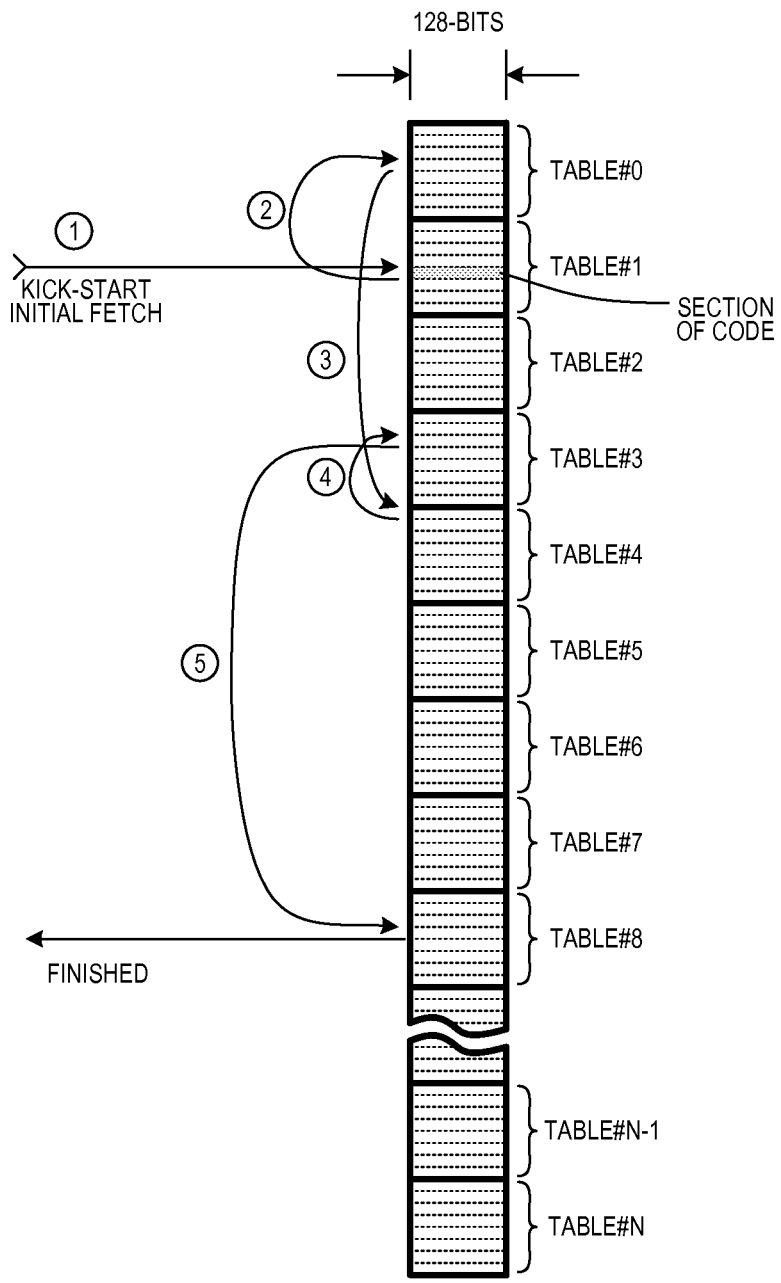
FIG. 15 is a diagram illustrating one sequence of instructions that can be executed by a picoengine.

The classifier 201 is an instance of the picoengine pool as described in: 1) U.S. patent application Ser. No. 14/267,298, entitled "Kick-Started Run-To-Completion Processor Having No Instruction Counter", filed May 1, 2014, by Gavin J. Stark; and 2) U.S. patent application Ser. No. 14/311,222, entitled "Skip Instruction To Skip A Number Of Instructions On A Predicate", filed Jun. 20, 2014, by Gavin J. Stark (the subject matter of these two patent documents is incorporated herein by reference). A detailed diagram of a picoengine pool is provided in FIG. 14. As explained in those patent documents, the picoengines of the picoengine pool are very small run-to-completion processors that and do not fetch instructions on their own (without external prompting or without being prompted to by having executed a fetch instruction), and that do not have instruction counters. Accordingly, the classifier circuit 115 does not include any processor that fetches instructions (without being prompted to by an external trigger or without being instructed to by having executed a specific fetch instruction), and that does not have an instruction counter, and that analyzes packets. This classifier circuit, however, does characterize and classify the incoming packet, thereby generating metadata 207 about the packet. The resulting metadata 207 can include information about the packet, information about the flow to which the packet belongs, information about how the packet was initially processed, and so forth. As explained in further detail below, if the port is in a novel "command mode", then the classifier 115 interprets the incoming packet as a special command packet, and orchestrates carrying out the operation called for by the opcode of the command packet, and if necessary generates a special command mode command packet that is then output from an appropriate egress port of the NFX. FIG. 15 illustrates a sequence of instructions that can be executed by a picoengine. The execution of a sequence of instructions by a picoengine within a picoengine pool as described in: 1) U.S. patent application Ser. No. 14/267,342, entitled "TABLE FETCH PROCESSOR INSTRUCTION USING TABLE NUMBER TO BASE ADDRESS TRANSLATION", filed May 1, 2014, by Gavin J. Stark; (the subject matter of this patent documents is incorporated herein by reference). In one example, the CCTC configures a picoengine within the picoengine pool to perform a first sequence of instructions when the analysis type is set to a first value, and configures the picoengine of the picoengine pool to perform a second sequence of instructions when the analysis type is set to a second value.

CCTC 115 writes to the various memories located in corner A 105 via connections 141 and connections 139 (address, data, control). Logic (not shown) included in CCTC 115 generates the address, data, and control signals based on output data from a picoengine. This logic is not shown but standard registered TO architecture can be used.

In addition to generating metadata, the classifier outputs an output data value 208, a template value 219, and start of packet—and the packet—length packet data 206. These outputs are provided to table lookup and mux circuit (TMLC) 202. Table lookup and mux circuit 202 includes a template RAM 221, mux A 222, mux B 223, a reduce table A 224, and a reduce table B 225, and a multiplexer circuit 226. The template RAM 221 has multiple inputs including an address input, a data input, and a read/write input. In operation the output data reader 233 of the classifier 201 can write a template value 219 into the template RAM 221 and can supply address to the template RAM 221 so to cause the template RAM 221 to output multiple to multiple multiplexer circuits and both reduce tables 224 and 225. In this fashion, the classifier is able to both program the template RAM 221 as well as select one of a plurality of template values stored in the template RAM 221. Selecting different template values will change the select input to the multiple multiplexer circuits, thereby adjusting which input terminal of a multiplexer circuit is coupled to the multiplexer circuit's output terminal and specify the lookup performed by each reduce table. The contents of template RAM 221 are illustrated in FIG. 10.

The output data value 208 is coupled to a first input of the multiplexer circuit 226, a first input of the mux A 222, and a first input of the mux B 223. The metadata 207 is coupled to a second input of the multiplexer circuit 202, a second input of the mux A 222, and a second input of the mux B 223. The start of packet—end of packet—length of packet data 206 is coupled to a fourth input of the multiplexer circuit 226. The output of mux A 222 is coupled to an input of reduce table A 224 and the output of the reduce table A 224 is coupled to a fourth input of the multiplexer circuit 226. In a similar fashion, the output of the mux B 223 is coupled to an input of Reduce table B 225 and the output of the Reduce table B 225 is coupled to a fit input of the multiplexer circuit 226.

In operation, the classifier controls (via the in the template RAM 221) (i) whether the output data value 208 or the metadata 207 is input to Reduce table A 224 through mux A 222, (ii) whether the output data value 208 or the metadata 207 is input to Reduce table B 225 through mux B 223, (iii) the type of lookup algorithm is performed by reduce table A 224, (iv) the type of lookup algorithm is performed by reduce table A 225, and (v) how the 6-bit compressed bits will be placed within a flow ID. The flow ID is a 256-bit value that is unique to the packet flow to which the packet belongs. The flow ID includes certain packet headers as is without any modification and "compressed" (reduced number of bits) versions of other packet headers. Other packet headers are omitted all together and are not included into the flow ID at all (e.g. due to knowledge of how the NFX integrated circuit is connected the omitted packet headers do not contain any useful information).

The Flow ID does not include any wildcards. The Flow ID is not select bits from only one field of the packet header. In one example, a selected bits are taken from the IP source field of the packet header, the IP destination field of the packet header, the TCP source port field of the packet header, the TCP destination port field of the packet header, and application layer protocol. Mux A 223 is shown in greater detail in FIG. 11. Mux A 222 includes multiple groups of multiplexers 260-263. Each group of multiplexers includes eight 48:1 multiplexers. The first group of multiplexers 260 receives output data [0:255] and metadata [0:127], the switching of which is controlled by ASEL[42:47] output by the template SRAM 221. Each bit of ASEL [42:47] is connected to one of the eight multiplexers. The second group of multiplexers 261 receives output data [0:255] and metadata [0:127], the switching of which is controlled by ASEL[36:41] output by the template SRAM 221. The third group of multiplexers 262 receives output data [0:255] and metadata [0:127], the switching of which is controlled by ASEL[30:35] output by the template SRAM 221. The last group of multiplexers 263 receives output data [0:255] and metadata [0:127], the switching of which is controlled by ASEL[0:5] output by the template SRAM 221.

Figure 12:
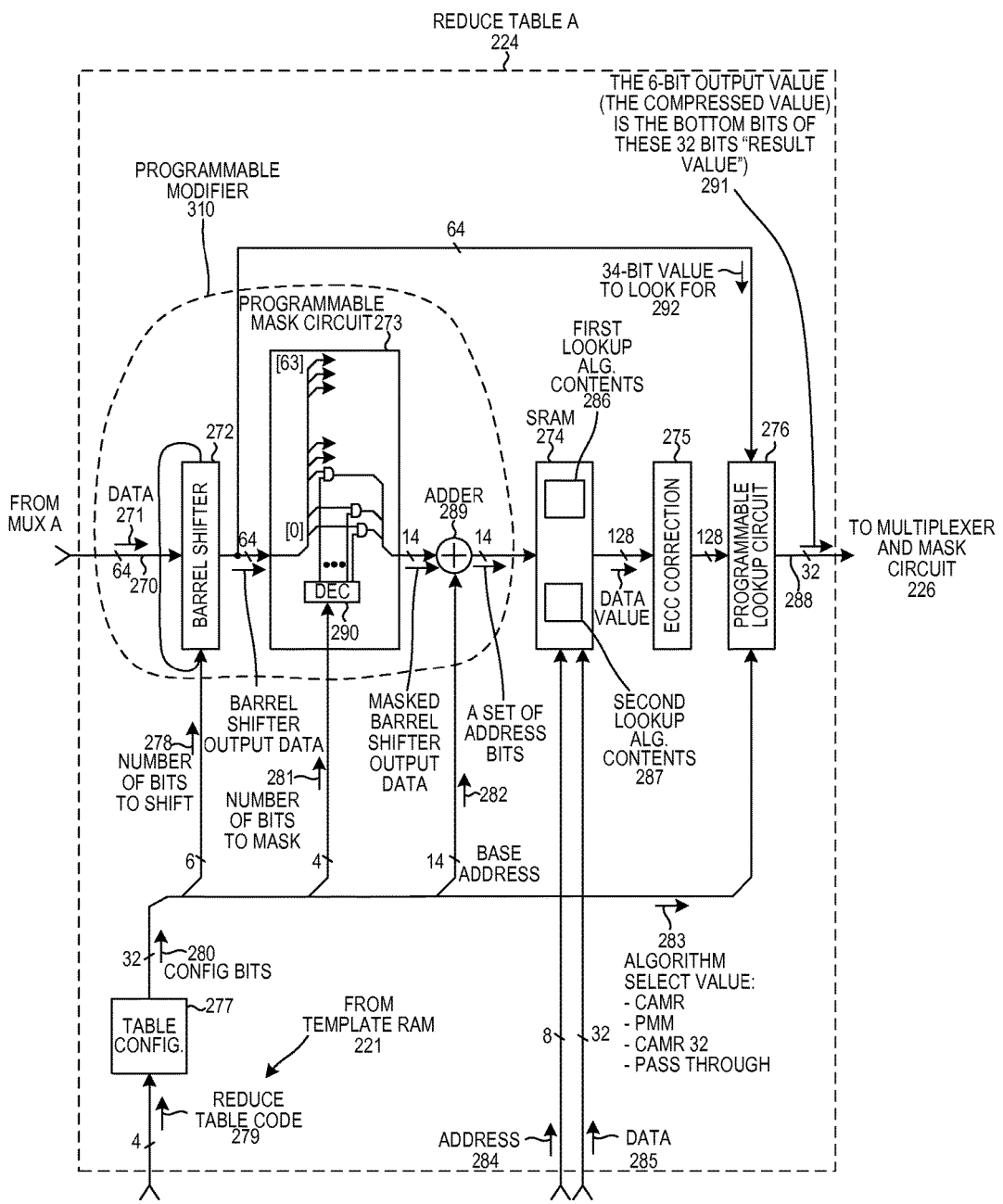
FIG. 12 is a more detailed diagram of reduce table A 224.

Reduce table A 224 generates a reduced MAC destination address. The reduce table A 224 is showing greater detail in FIG. 12. Reduce table A 224 includes a barrel shifter 272, a programmable mask circuit 273, and adder circuit 289, and SRAM 274, ECC correction circuit 275, a programmable lookup circuit 276, and a configuration table 277. In operation, reduce table code 279 is received by the configuration table 277 from the template RAM and causes the configuration table 277 to output configuration bits 280. Different portions of the configuration this 280 are coupled to different circuits within the Reduce table A 224. In one example, configuration bits 280 includes 32 bits, six of which are identified as a number of bits to shift 278, four of which are identified as a number of bits to mask 281, 14 of which are identified as a base address 282, and eight of which are identified as an algorithm select value 283.

Figure 11:
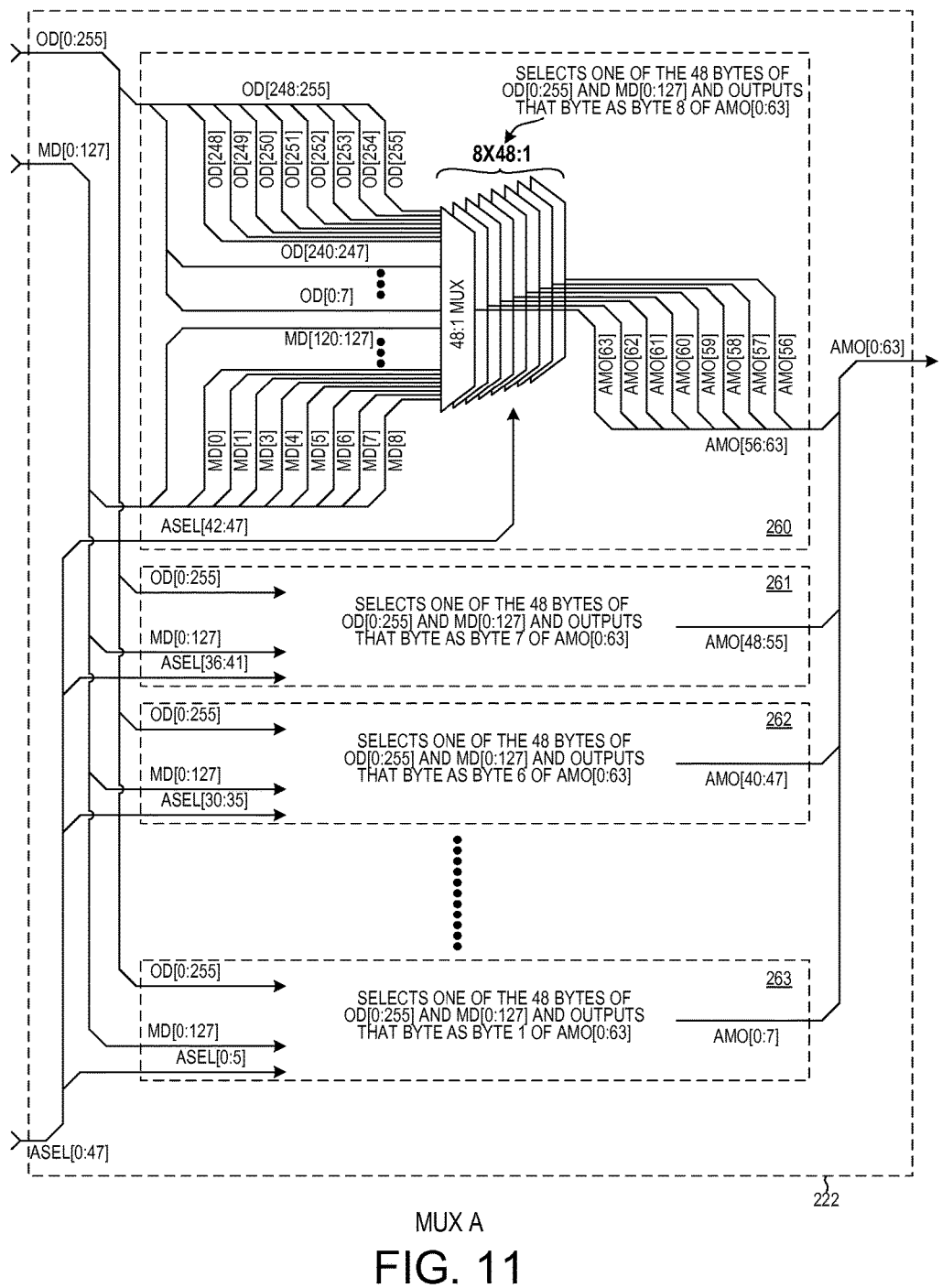
FIG. 11 is a more detailed diagram of mux A 223.
Figure 24:
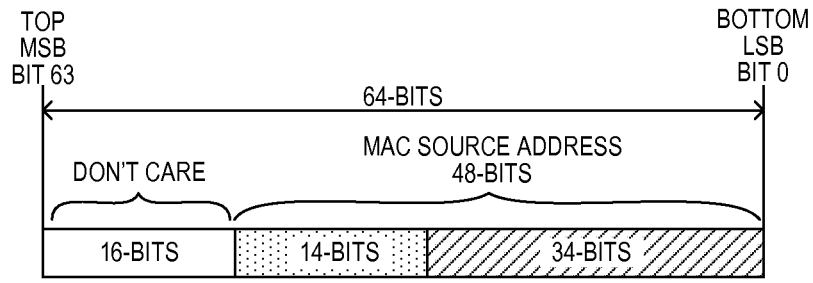
FIG. 24 is a diagram of an input to a reduce table A.
Figure 25:
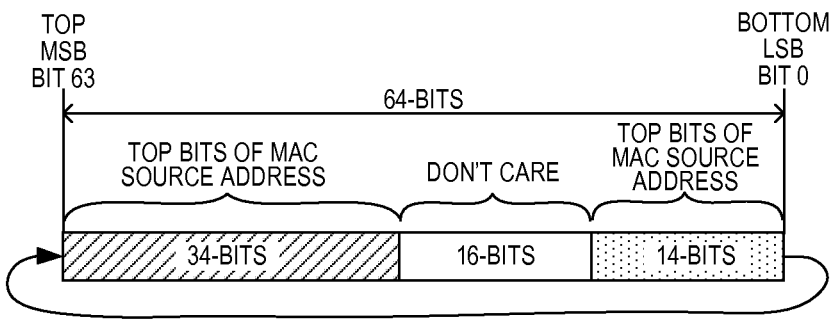
FIG. 25 is a diagram of an output of a barrel shifter included in reduce table A.

Either the output data value 208 or the metadata 207 is input via connections 272 to barrel shifter 272 from mux A 222 as shown in FIG. 11. FIG. 24 illustrates the input data input to reduce table A. The input data includes 16 don't care bits and 48 MAC source address bits. The top 14 bits of the MAC source address need to be bottom aligned so to be aligned for the programmable mask circuit 273. The bottom 34 bits of the MAC source address need to be top aligned so to be aligned to for lookup algorithm 276. Barrel shifter 272 rotates the input data according to the number of bits to shift value 278 to provide the desired alignment. FIG. 25 illustrates the bit alignment of the data output from barrel shifter 272. As desired, the 34 bits of MAC source address are top aligned and the 14 bits of MAC source address are bottom aligned. The shifted data is coupled from barrel shifter 272 to programmable mask circuit 273 and programmable lookup circuit 276. In the specific example illustrated in FIG. 12 only the top 34 bits of the shifted data 292 are provided to the programmable lookup circuit 276. The programmable mask circuit 273 includes a decoder 290 that generates 14 binary output signals ("barrel shifter output data") in response to receiving the number of bits to mask value 281. Each of the 14 binary output signals are coupled to a first input of an AND gate. A second input of each AND gate is coupled to receive one of the bottom 14 bits of the shifted data. The programmable mask circuit 273 thereby outputs a 14 bit masked value ("masked barrel sifter output data") to the input of adder 289. The adder 289 performs a bit-wise addition of the 14 bit masked value and the base address value 282 and outputs the results ("a set of address bits") to SRAM 274. The combination of barrel shifter 272, programmable mask circuit 273 and adder 289 is referred to herein as "a programmable modifier" 310.

Figure 26:
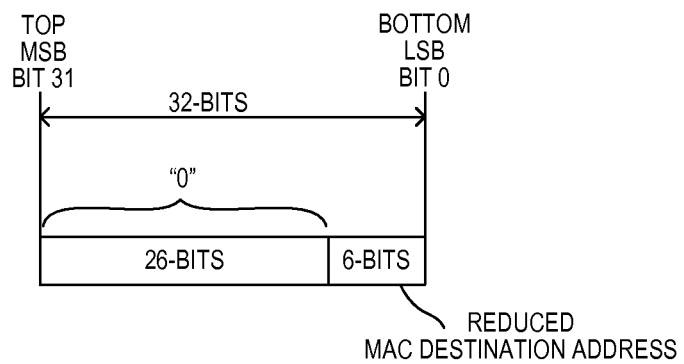
FIG. 26 is diagram of an output from reduce table A.

SRAM 274 includes both a first lookup algorithm contents 286 and a second lookup algorithm contents 287. The result from adder 289 serves as an address into SRAM 274. In response to receiving the result from adder 289 the SRAM 274 outputs a reference value to ECC correction 275. The reference value is then output to programmable lookup circuit 276. The type of algorithm performed by programmable lookup circuit 276 is determined by the algorithm select value 283. In one example the programmable lookup circuit 276 can perform a CAMR 34 lookup algorithm. The programmable lookup circuit 276 is an instance of the CAMR 32 lookup algorithm as described in: 1) U.S. patent application Ser. No. 13/598,448, entitled "TRANSACTIONAL MEMORY THAT PERFORMS A CAMR 32-BIT LOOKUP OPERATION", filed Aug. 29, 2012, by Gavin J. Stark; (the subject matter of which is incorporated herein by reference). A 6-bit output value is output by the lookup algorithm 276 after performing the CAMR 34 lookup algorithm. The 6-bit output value is a compressed or "reduced" version of the 64-bit input the data value 271. FIG. 26 illustrates the output value from reduce table A. The 6 bits of reduced MAC destination address are bottom aligned and padded with 26 "0" s. The output value is coupled to the multiplexer circuit 226.

Figure 27:
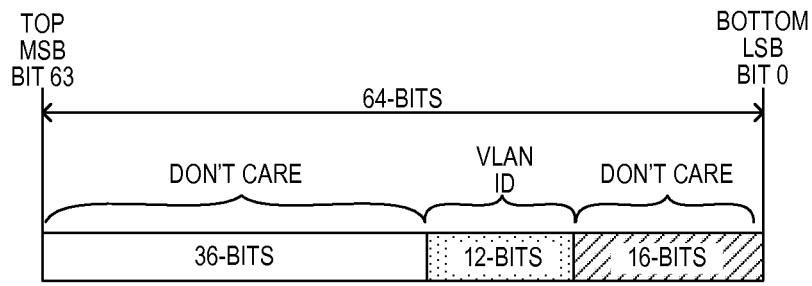
FIG. 27 is a diagram of an input to reduce table B.
Figure 28:
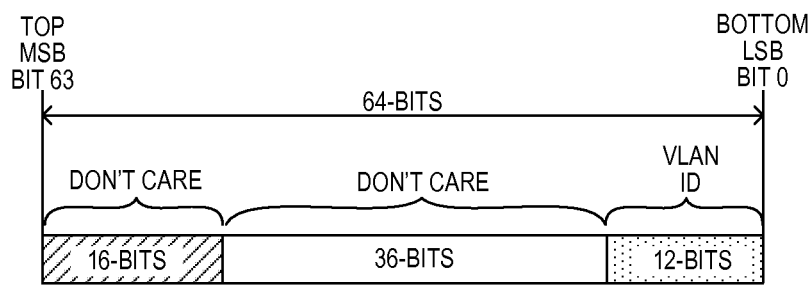
FIG. 28 is a diagram of an output of a barrel shifter included in reduce table B.
Figure 29:
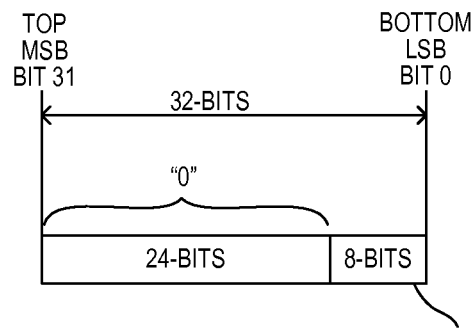
FIG. 29 is a diagram of an output from reduce table B.

Reduce table B 225 generates a reduced VLAN ID. The structure of reduce table B 255 is the same as the structure illustrated in FIG. 12 for reduce table A 224. FIG. 27 illustrates an example of input data to reduce table B 225. The input data is either output data value 208 or the metadata 207. In the present example, the input data includes 36 don't care bits that are top aligned, 12 bits of VLAN ID, and 16 more don't care bits that are bottom aligned. In operations, table configuration circuit sets configuration bits such that the algorithm select value is set to "pass through" mode. In pass through mode, the programmable lookup circuit automatically outputs one of the plurality of 6-bit values read from SRAM. A barrel shifter included in reduce table B 225 rotates the input data such that the VLAN ID is bottom aligned as shown in FIG. 28. The 12 bits of VLAN ID are masked by the programmable mask circuit and added to a base address value, thereby generating a set of address bits. The set of address bits are used to read a data value from an SRAM memory. The data value read from the SRAM memory includes one or more 6-bit values. In one example, based on the programmable lookup up circuit configuration, the programmable lookup circuit simply outputs the first of the data values read from the SRAM memory. FIG. 29 illustrates the output of reduce table B 225. The output from reduce table B includes 8 bits of reduced VLAN that are bottom aligned and 24 "0" bits padding the remainder of the 32 bit output value.

Figure 13:
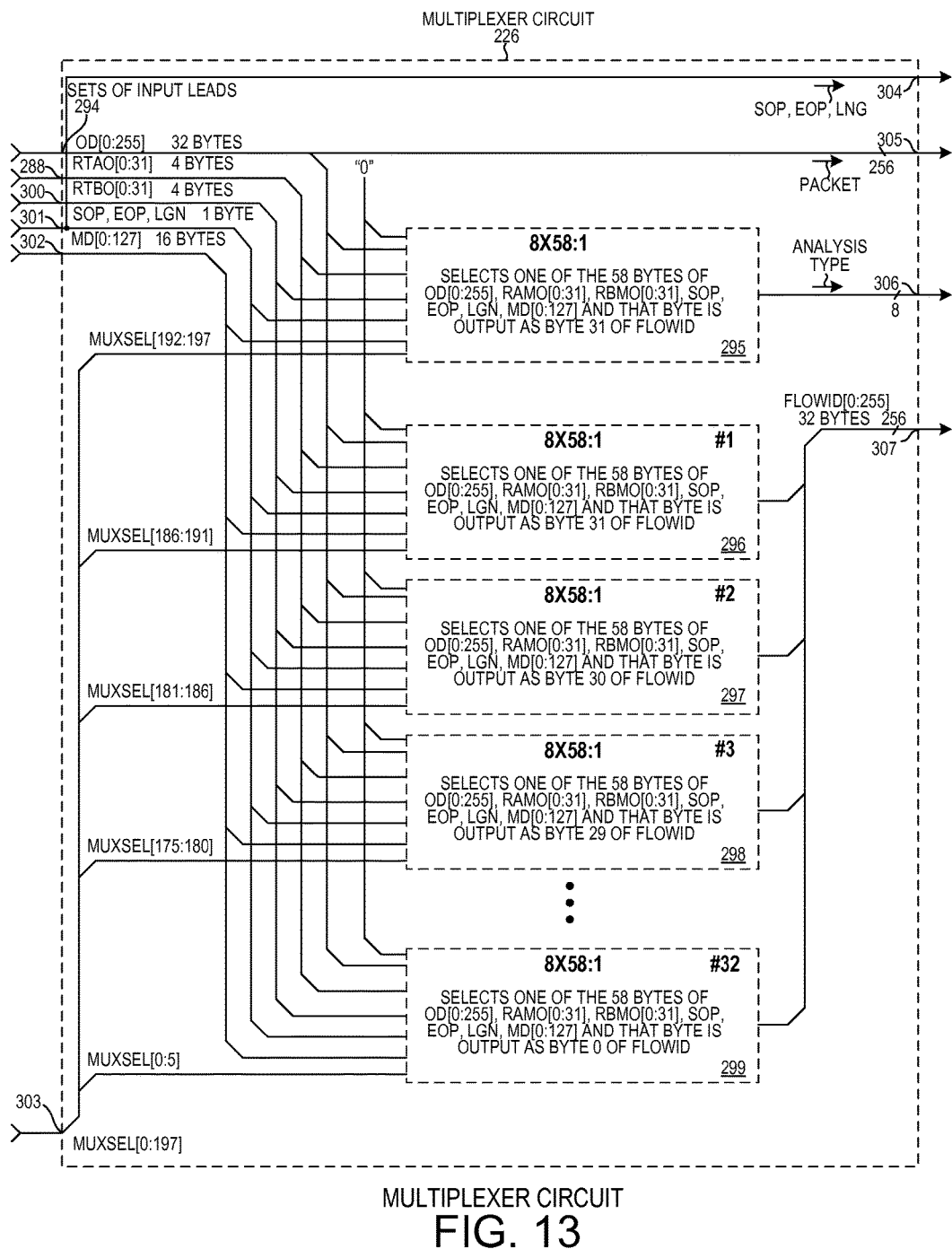
FIG. 13 is a more detailed diagram of multiplexer circuit 226.
Figure 30:
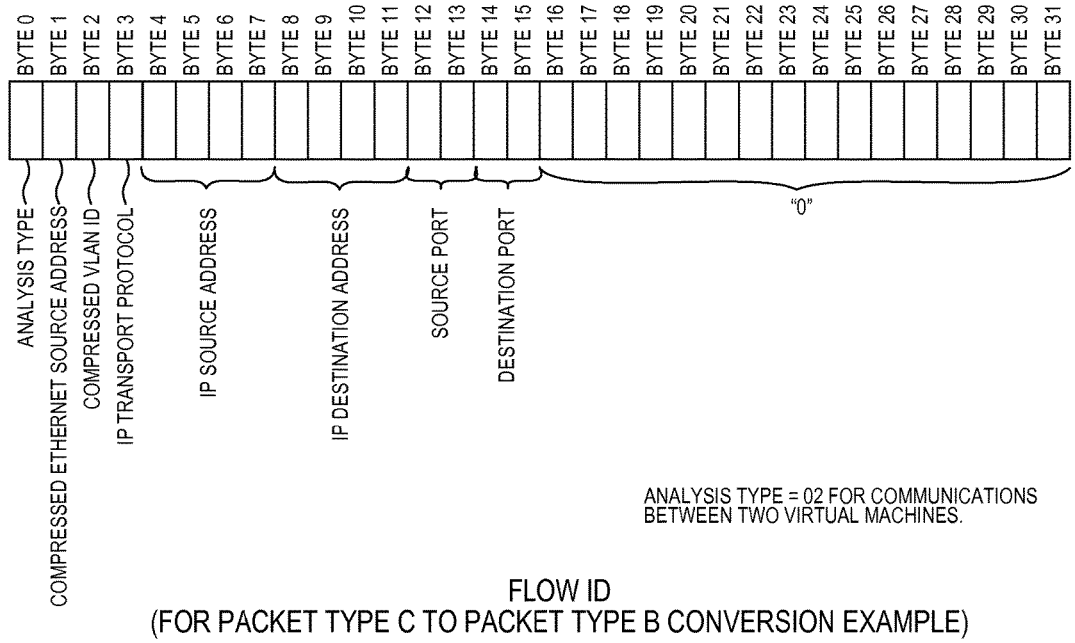
FIG. 30 is a diagram of a flow ID.

FIG. 13 illustrates the multiplexer circuit 226 in greater detail. Multiplexer circuit 226 includes 32 groups of multiplexers 295-299. Each group of multiplexers includes eight 58:1 multiplexers. Each group of multiplexers receives output data [0:255] via connections 294, reduce table A output value [0:31] via connections 288, reduce table B output value [0:31] via connection s300, start of packet—end the packet—length of packet [0:8] via connections 301, and metadata [0:127] via connections 302. The first group of multiplexers 295 also receives MUXSEL [192:197] via connections 303. The second group of multiplexers 296 also receives MUXSEL [186:191]. The third group of multiplexers 297 also receives MUXSEL [181:186]. The fourth group of multiplexers 298 also receives MUXSEL [175:180]. The last group of multiplexers 299 also receives MUXSEL [0:5]. The first group of multiplexers 295 output the analysis type value. The remaining 31 groups of multiplexers 296-299 combined to output 32 bytes of the flow ID via connections 307. In this fashion the value stored in the template RAM 221 control the flow ID output by the multiplexer circuit 226. FIG. 30 illustrates the contents of each byte of the flow ID. The analysis type is stored in byte 0, the compressed ethernet source address is stored in byte 1, the compressed VLAN ID is stored in byte 2, the IP transport protocol is stored in byte 3, the IP source address is stored in bytes 4-7, the IP destination address is stored in bytes 8-11, the source port is stored in bytes 12-13, the destination port is stored in bytes 14-15, and "0s" are stored in remaining bytes 16-31.

Referring back to FIG. 5, the CCT circuit 115 outputs the flow ID 117 to CCT circuit 118. In the present example CCT circuit 118 simply passes the flow ID through to the input of the exact-match flow table structure 121 as Flow ID 119. Flow IDs 117 and 119 are also referred to here as a "flow key".

Figure 6:
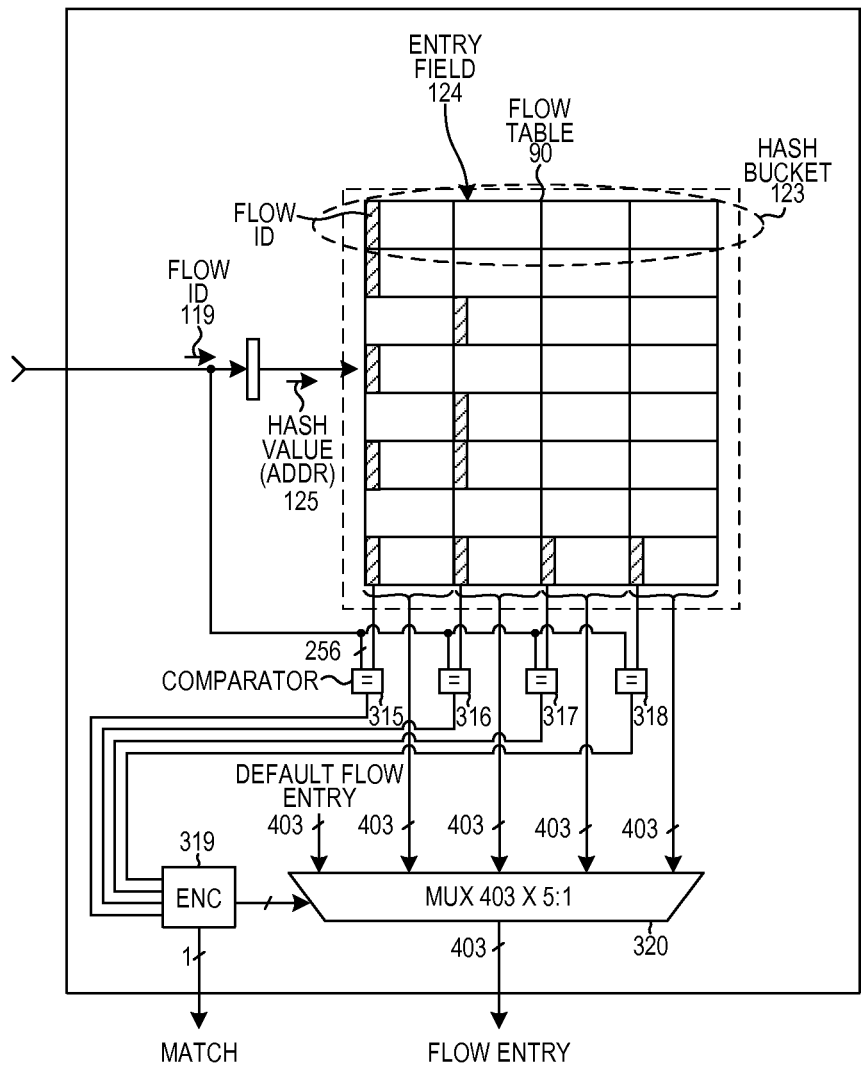
FIG. 6 is a more detailed diagram of the exact-match flow table structure shown in FIG. 5.

Exact-match flow table structure 121 is a circuit that includes a hash generator circuit 122 and a memory and associated hash lookup circuitry. The exact-match functionality of exact-match flow table structure 121 is illustrated in FIG. 6. The exact-match flow table structure does not and cannot store a flow ID that has wildcards. The exact-match flow table structure does not include any information from a particular field of an incoming packet to which a value is to be matched. There is only 1-bit of SRAM that is used to store any single bit of a flow ID.

The memory maintains and stores the flow table 90 of the corner portion, where the flow table 90 includes a set of hash buckets, and where each hash bucket includes a set of entry fields. The illustrated hash bucket 123 is shown in the diagram as a row of boxes. The second entry field of the bucket is identified by reference numeral 124. The hash generator 122 generates a hash value 125 from the flow ID 119, and supplies the hash value 125 to the flow table circuitry. The hash value points to one of the hash buckets. In response, the flow ID stored in each entry fields of the selected bucket is supplied to a different comparator circuit 315-318. Each comparator circuit also receives the input flow ID 119. Each comparator determines if the flow ID received from each of the entry fields in the flow table is an exact-match of input flow ID 119. The output from each comparator circuit 315-318 is grouped together to form a multi-bit select line that is coupled to input leads of encoder 319. Encoder 319 outputs a single bit match value that indicates if a flow ID exact-match was found by comparators 315-319. Encoder 319 also outputs a multi-bit select value to multiplexer 320. In the present example, multiplexer 320 includes 403 5-to-1 multiplexers. If an exact-match is found, then the entire flow entry from which the matching flow ID was stored is output on the output terminals of multiplexer 320. If an exact-match is not found, a default flow entry is output by multiplexer 320.

Figure 31:
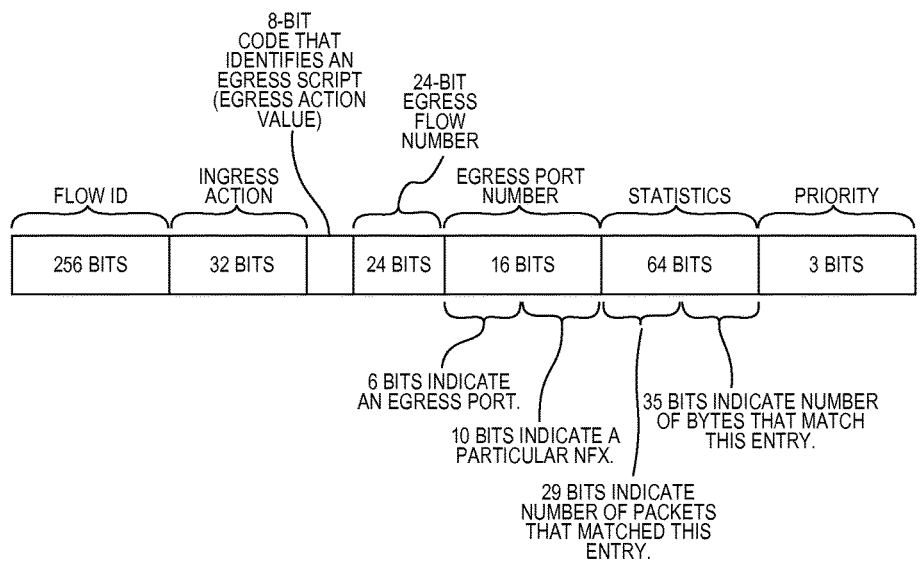
FIG. 31 is a diagram of the flow entry that is stored in an entry field in the flow table of the corner portion of FIG. 5.

FIG. 31 is a diagram that illustrates the values (a "flow entry") that are stored in one entry field of a hash bucket of the flow table if that entry field is occupied (occupied by a "flow entry"). The first 256-bit value in any occupied entry field of the hash bucket are tested to determine if one of the entry fields stores the 256-bit flow ID value 119. If it does, then there is said to be a "hit". If there is no match, then there is said to be a "miss". For there to be a hit, the 256 bits of the incoming flow ID must match exactly the 256 bits of the first 256-bit "flow ID" field at the beginning of the overall flow entry.

Assuming in this example that there is a "hit", then the remaining values (see FIG. 31) of the flow entry stored in the entry field are output as a match value (the number of the flow entry), an ingress action value, an egress action value (including an 8-bit code that identifies an egress script), a 24-bit value that represents an egress flow number, an egress port value (including 6-bits that indicate an egress port and 10-bits that indicate particular NFX), a statistics value (including 29-bits that indicate the number of packets that matched this entry and 35-bits that indicate the number of bytes that match this entry), and a priority value. The action may, for example, be an instruction to output the corresponding packet onto a particular egress port of a particular corner portion of the NFX circuit.

Figure 34:
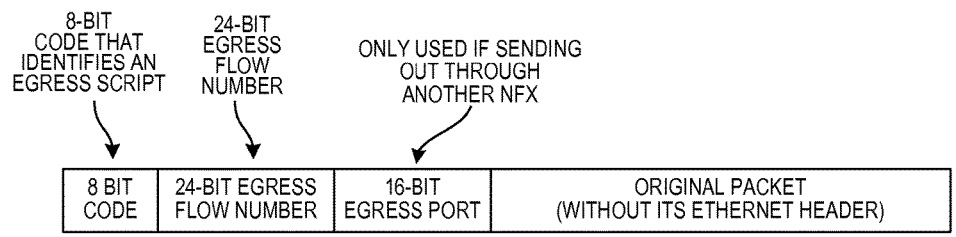
FIG. 34 is a diagram illustrating the contents of a crossbar communication.

The actual packet, rather than being passed to the flow table structure 121, is buffered in buffer SRAM block 126. An instruction and information appropriate to cause the looked-up action to be carried out is loaded into the queue for the egress port (the egress port from which the packet is to be output from the NFX circuit in accordance with the looked-up action in this example). There is one such queue in block 110 for each egress port of the NFX circuit. At an appropriate time as indicated by the scheduler 111, the crossbar circuit 112 is controlled by the scheduler 111 to direct the packet (which is now being output by the buffer SRAM 126 to the crossbar circuit 112) through the crossbar switch circuitry to the particular FIFO 128 for the indicated egress port. The crossbar communication is illustrated in FIG. 34. The first 8 bits of the crossbar communication is an 8-bit code that identifies an egress script. The next 24-bits of the crossbar communication is a 24-bit egress flow number. The next 16-bits of the crossbar communication is a 16-bit egress port number which is only used when sending the crossbar communication through another NFX. The remainder of the crossbar communication is the original packet excluding its original ethernet header.

Figure 16:
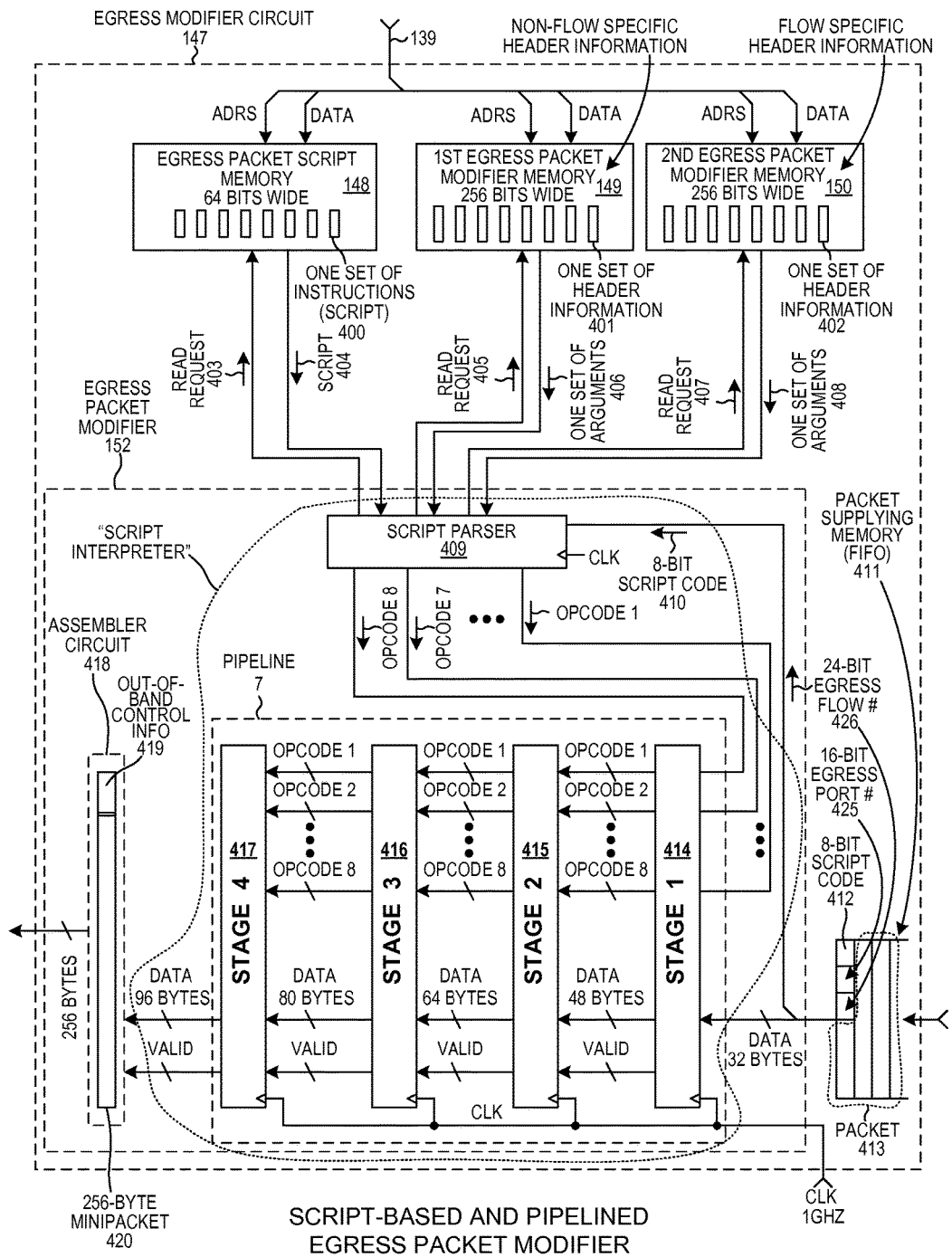
FIG. 16 is a more detailed diagram of egress modifier circuit 147.

The egress FIFO block 127 includes one such FIFO for each of the egress ports of the NFX circuit. The packets buffered in the FIFO 128 are supplied to egress modifier circuit 147. Egress modifier circuit 147 includes three memories 148-150, an input buffer 151, and an egress packet modifier 152. FIG. 16 illustrates the egress modifier circuit 147 in greater detail. For a detailed description of the inner workings of the egress packet modifier circuit 147 see: U.S. patent application Ser. No. 14/941,494, entitled "Script-Controlled Egress Packet Modifier", filed Jul. 14, 2013, by Chirag P. Patel and Gavin J. Stark (the subject matter of which is incorporated herein by reference).

Figure 35:
FIG. 35 is a diagram illustrating the contents of one set of arguments read from the argument A SRAM in the egress modifier.
Figure 36:
FIG. 36 is a diagram illustrating the contents of one set of arguments read from the argument B SRAM in the egress modifier.

Memory 148 is an egress packet script memory that is 64 bits wide and stores instruction sets (also referred to as "scripts"). Memory 149 is a first egress packet modifier memory that is 256 bits wide and stores non-flow specific header information. Memory 150 is a second egress packet modifier memory that is 256 bits wide and stores flow specific header information. Memories 148-150 are written to via connections 139 from CCT circuit 115. A script parser 409 included in the egress packet modifier 152 receive an 8-bit script code 410 and a 24-bit egress flow number 426 that was communicated across the crossbar along with the packet. By adding the appropriate script code to the front of the packet, the corner of the NFX determines the type of egress processing that will later be performed on the packet by the egress packet modifier. In operation, the script parser 409 generates a first memory address based on the 8-bit script code received from packet supply memory (FIFO) 411 and sends a read request to the egress packet script memory 148 that includes the first memory address. The script parser 409 also generates a second memory address based on the 8-bit script code and sends a read request to the first egress packet modifier memory 149 that includes the second memory address. The script parser 409 further generates a third memory address based on the 24-bit egress flow number 426 received from packet supply memory (FIFO) 411 and send a read request to the second egress packet modifier memory 150 that includes the third memory address. In response to the three read requests the script parser 409 receives one set of instructions ("script") 404, one set of non-flow specific header information 406, and one set of flow specific header information 408. An example of a set of non-flow specific header information read out of the first egress packet modifier is illustrated in FIG. 35. The set of header information read out of the first egress packet modifier memory includes an IP versions checksum value, a transport protocol value, and VXLAN network ID value, and ethernet destination address, and an ethernet source address. The script parser 409 reads a second set of header information 408 from the second egress packet modifier memory 150 in response to sending a read request 407. An example of a set of flow specific header information read out of the second egress packet modifier memory is illustrated in FIG. 36. The set of arguments read out of the second egress packet modifier memory includes an ethernet destination address, an ethernet source address, and IP source address, and ethernet transport protocol, and IP transport protocol, a transport protocol, and an ethernet transport protocol.

The script parser 409 also receives a clock input signal that is shared with pipeline 7. Script parser 409 outputs multiple opcodes (OPCODES 1-8). Pipeline 7 includes multiple stages 414-417. All eight opcodes generated by the script parser 409 are supplied to stage 1 along with 32 bytes of packet data from packet supplying memory 411. Each stage of the pipeline 7 adds a portion of header information read from the egress packet modifier memories to the packet data. The combination of the script parser 409 and pipeline 7 is referred to herein as a "script interpreter".

The 256-byte minipacket 420 is supplied to an egress MAC circuit 129. For additional information on egress MAC circuit 129, see: U.S. patent application Ser. No. 14/321,732, entitled "Merging PCP Flows As They Are Assigned To A Single Virtual Channel", filed Jul. 1, 2014, by Joseph M. Lamb (the subject matter of which is incorporated herein by reference). The packet is then output from the egress port of the NFX as indicated by the flow entry in the flow table 90. As described in further detail below, the NFP circuit 53 controls how the NFX circuits 49-52 switch the incoming packets onto output ports of the SDN switch 21. The NFP circuit 53 does this by loading appropriate values into the flow tables of the NFX circuits.

A set of values in an entry field of a flow table of an NFX circuit is also referred to as a "flow entry". An incoming packet received onto the SDN switch 21 via one of the NFX circuits may be switched so that it is output from the SDN switch 21 via an NFX circuit. Alternatively, or in addition, an incoming packet received onto the SDN switch 21 via one of the NFX circuits may be switched so it is supplied across one of the network links to the NFP circuit 53. How the packet is switched depends on the type of packet received, and how the flow tables of the NFX circuits are loaded.

If there is a "miss", then there was no flow entry in the flow table structure 121 whose "flow ID" field matched (matched exactly) the "flow ID" of the incoming packet. In this case, the flow table structure 121 takes a default action. The default action is to forward the packet to the NFP circuit using a special command packet format. The NFP initializes the flow table structure of each NFX circuit so that the default action will generate a proper command packet with the proper command header or headers, and so that this proper command packet will be output from the NFX onto the correct NFX egress port such that the command packet will be make its way to the NFP.

Figure 17:
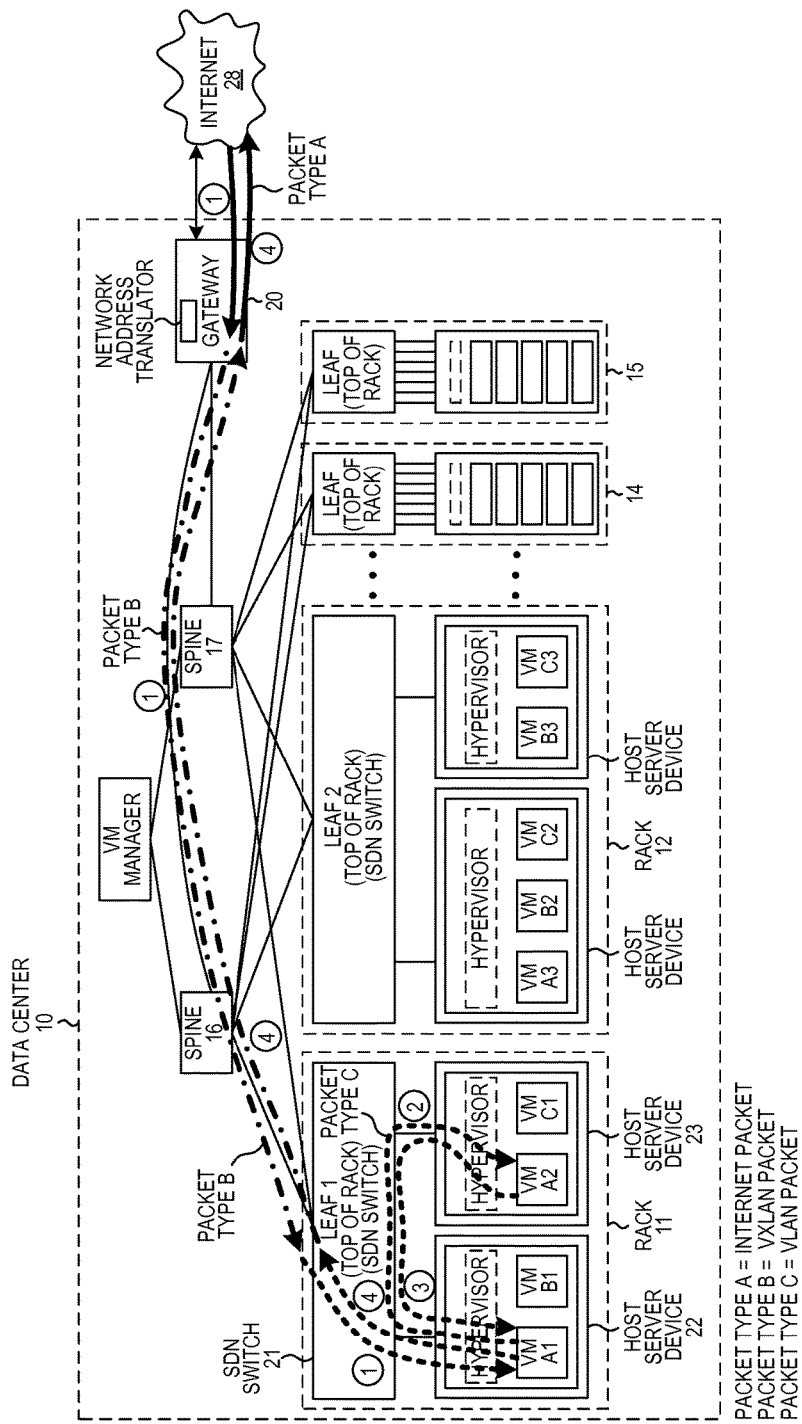
FIG. 17 is a more detailed diagram of the data center 10 of FIG. 1.
Figure 18:
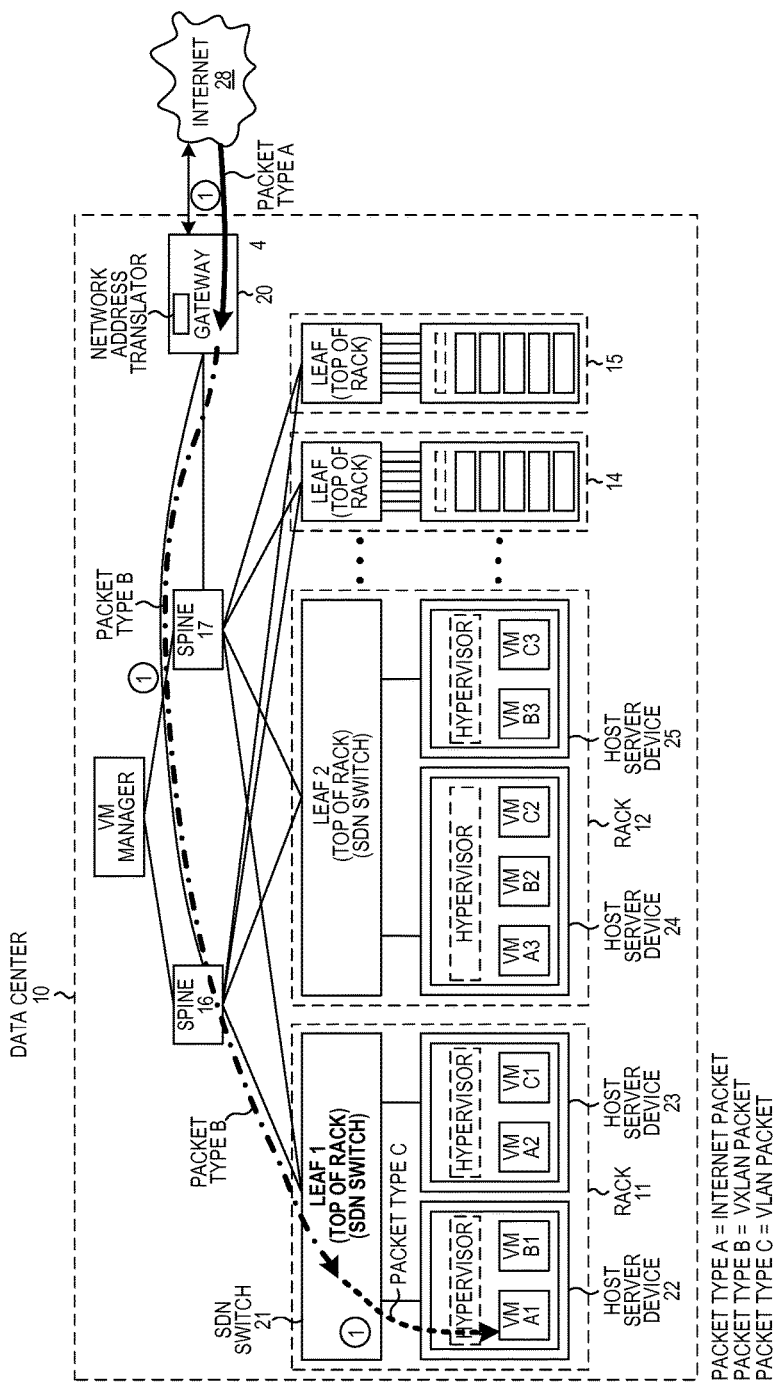
FIG. 18 is a diagram of a communication from the gateway to the virtual machine in the data center.
Figure 19:
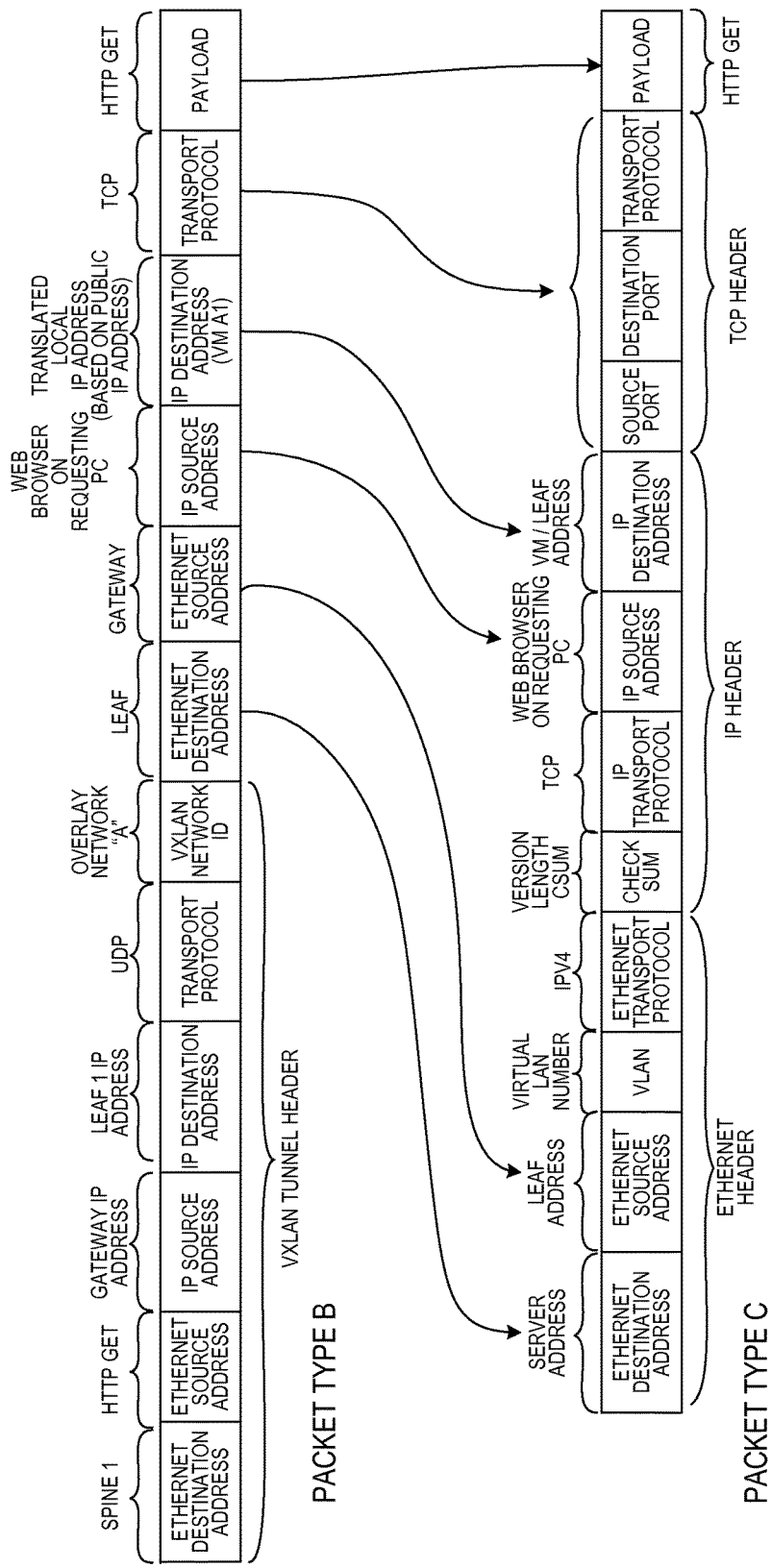
FIG. 19 is diagram illustrating the conversion from packet type B to a packet type C.

FIG. 17 illustrates a data center 10 of FIG. 1 in greater detail. A specific example of a Web server operating on a virtual machine (VM A1) on a host server device 22 located around 11 switched by a SDN switch 21 which communicates with a gateway 23 via a spine 16 is described herein. FIG. 18 illustrates a first instance in which an HTTP request is communicated from the Internet 18 to the virtual machine VM A1 running on host server device 22 (communication #1). This communication is a five tuple communication packet not including any tags. This type of communication is referred to herein as a "packet type A" packet. The gateway 20 includes a network address translator that converts the incoming packet carrying the HTTP get requests from a packet type A to a packet to B by adding a VXLAN header to the packet. The packet is then communicated from the Gateway 20 through spine 16 to SDN switch 21 (also referred to herein as a "leaf" and a "top of rack switch"). The SDN switch 21 converts the packet from a packet type B to a packet type C, wherein a packet type C does not have a VXLAN header, but rather a VLAN header. The conversion from packet type B to a packet type C is illustrated in FIG. 19. As is shown in FIG. 19 the entire VXLAN header is removed by the SDN switch 21. The ethernet destination address is changed from the leaf (SDN switch 21) ethernet address to the server ethernet address. The ethernet source address this change from the gateway ethernet address to the leaf ethernet address. Four fields are added: (i) a VLAN virtual LAN number, (ii) an ethernet transport protocol (e.g. IPV4), (iii) a checksum value, and (v) an IP transport protocol (e.g. TCP). The IP destination address is changed from the public IP address from which the HTTP request originated to the IP address of the leaf for virtual machine. All other packet fields remain the unchanged. After this transformation from a packet type B packet to a packet type C packet, the HTTP request is communicated to virtual machine VM A1 running on host server device 22.

Figure 20:
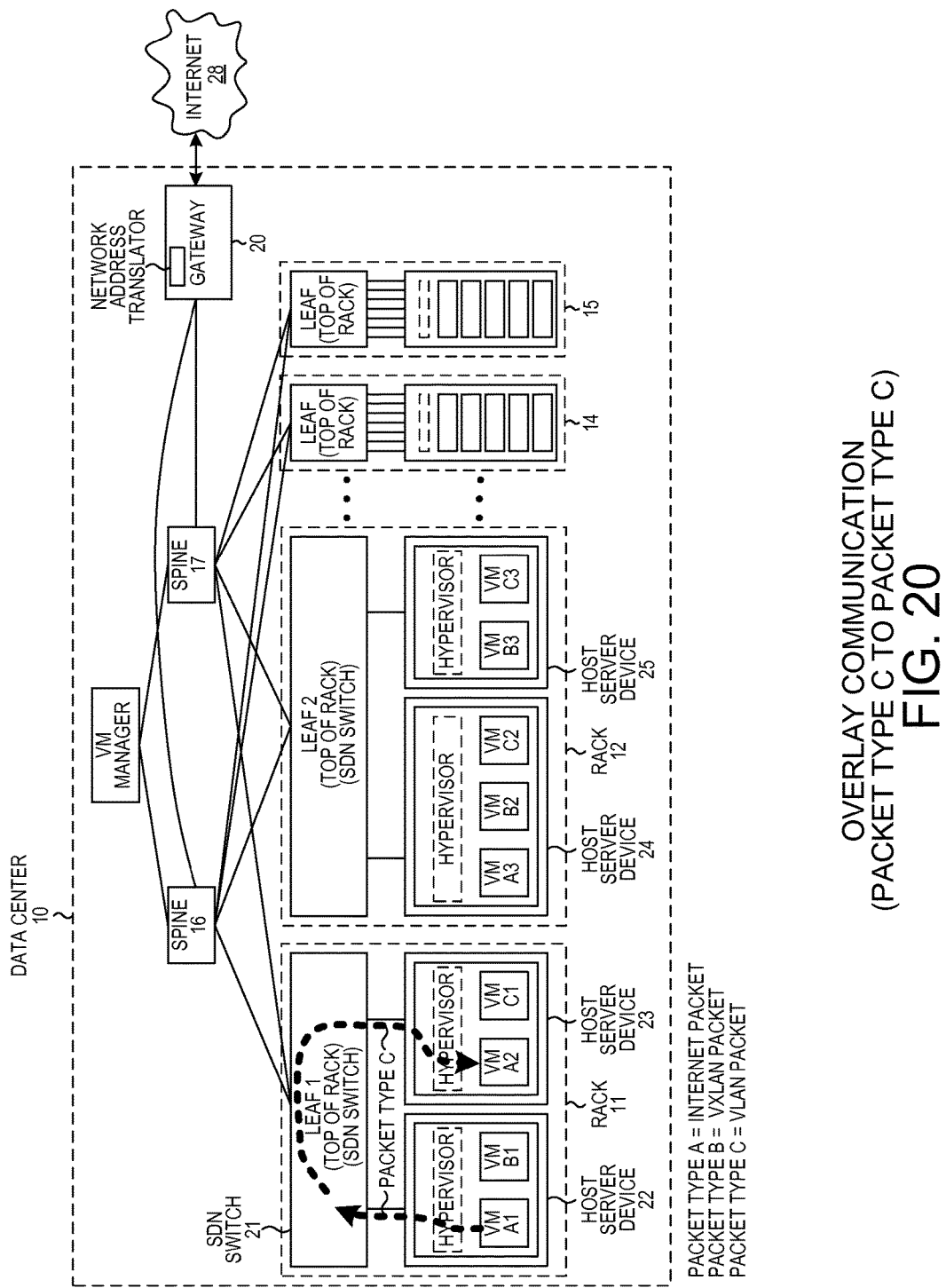
FIG. 20 is a diagram of a communication between a first virtual machine and a second virtual machine through a single SDN switch.

FIG. 20 illustrates a scenario in which the website application running on the host server device 22 needs to access information stored on virtual machine VM A2 running on host server device 23 before serving up the request webpage (e.g. accessing login information or an image file) (communication #2). To access information stored on virtual machine VM A2 the Web server running on VM A1 has to send a packet type C (VLAN packet) to SDN switch 21 to access a virtual machine running outside of host server device 22. SDN switch 21 will in turn communicate a packet type C to the virtual machine VM A2 running on host server device 23 within rack 11. Given that the packet type communicated from virtual machine VM A1 to virtual machine VM A2 is the same packet type C, the SDN switch 21 does not need to modify the packet type. The similar scenario in which virtual machine VM A2 responds with the requested data to virtual machine VM A1 (communication #3) also does not require any packet modification.

Figure 21:
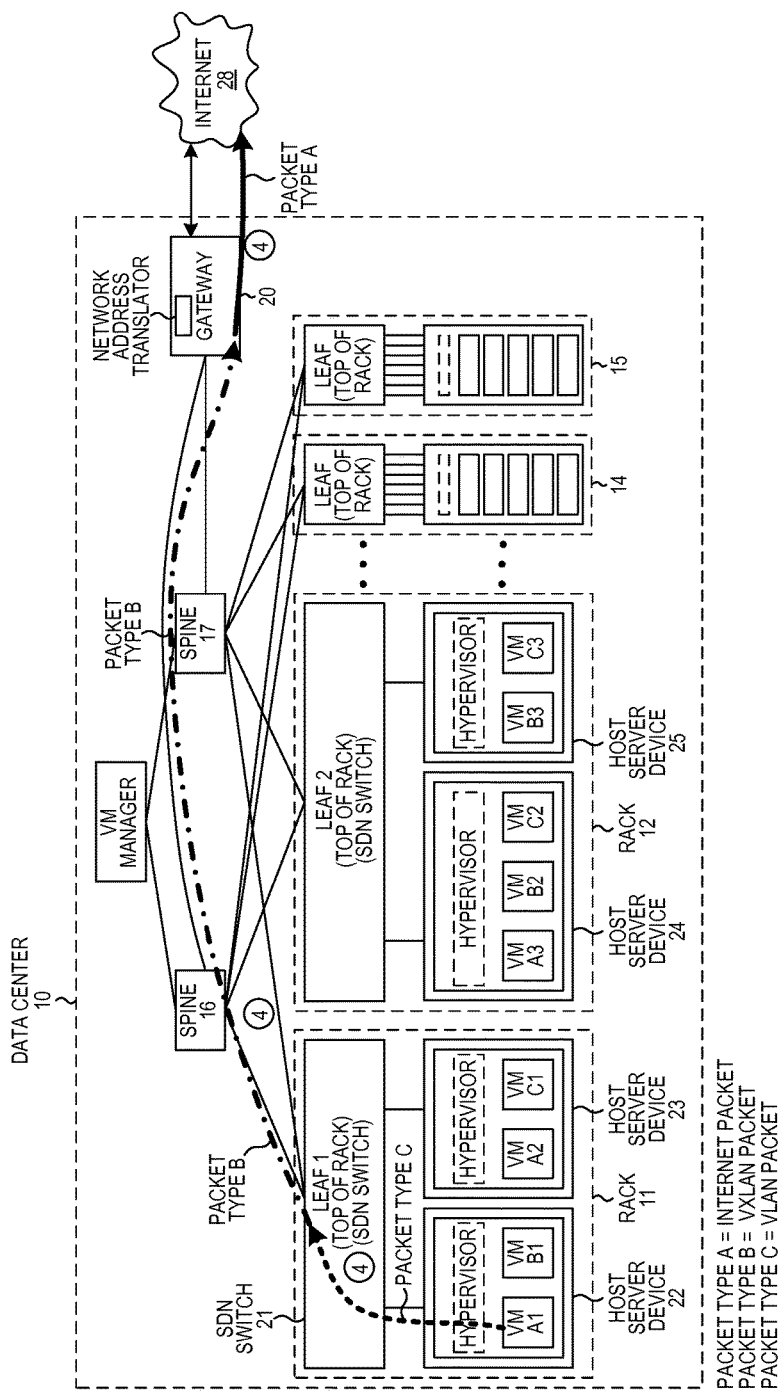
FIG. 21 is a diagram of a communication from a virtual machine through a SDN switch and a spine to a gateway.
Figure 22A:
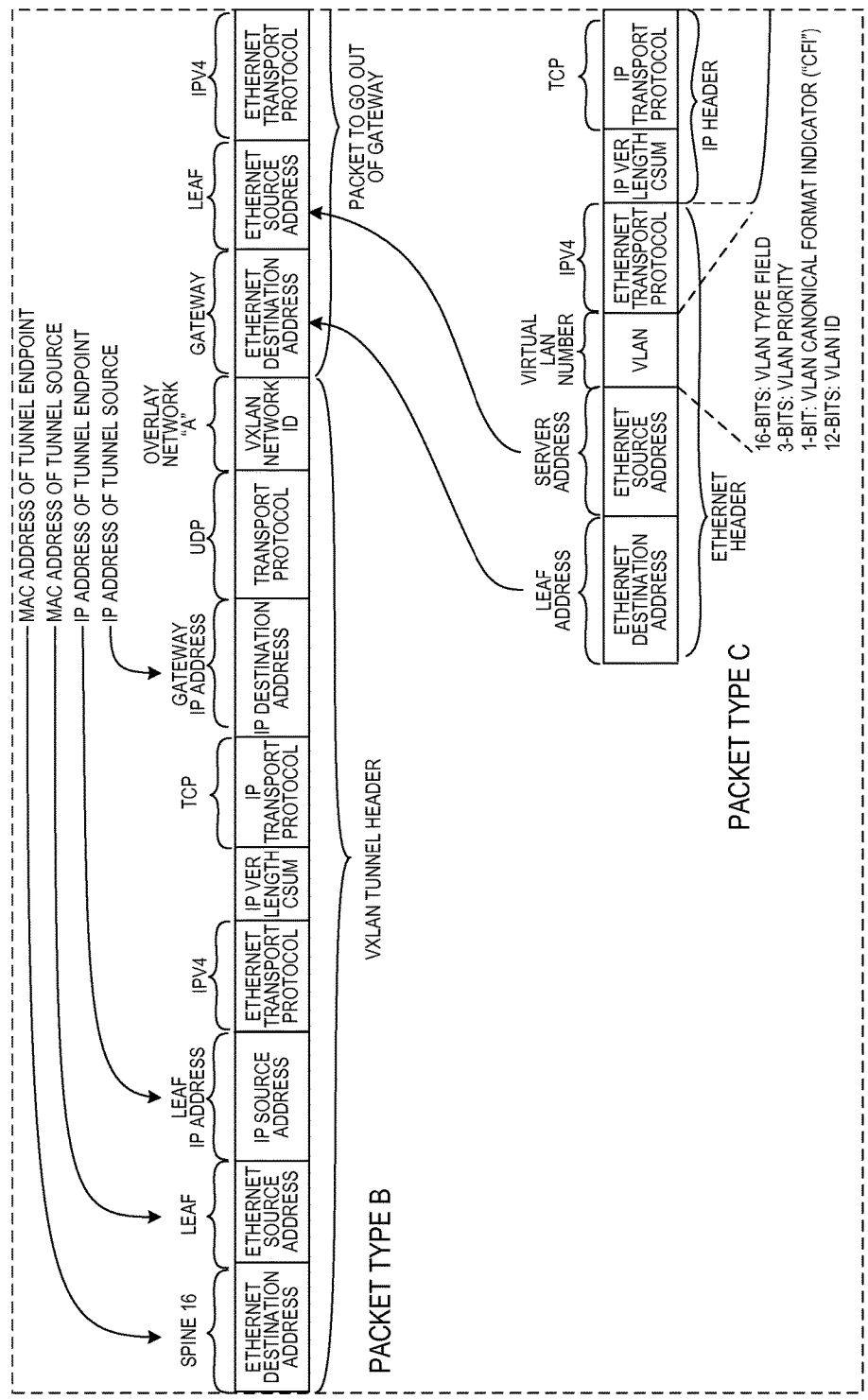
FIG. 22A is a diagram illustrating a conversion from a packet type C to a packet type B.
Figure 22B:
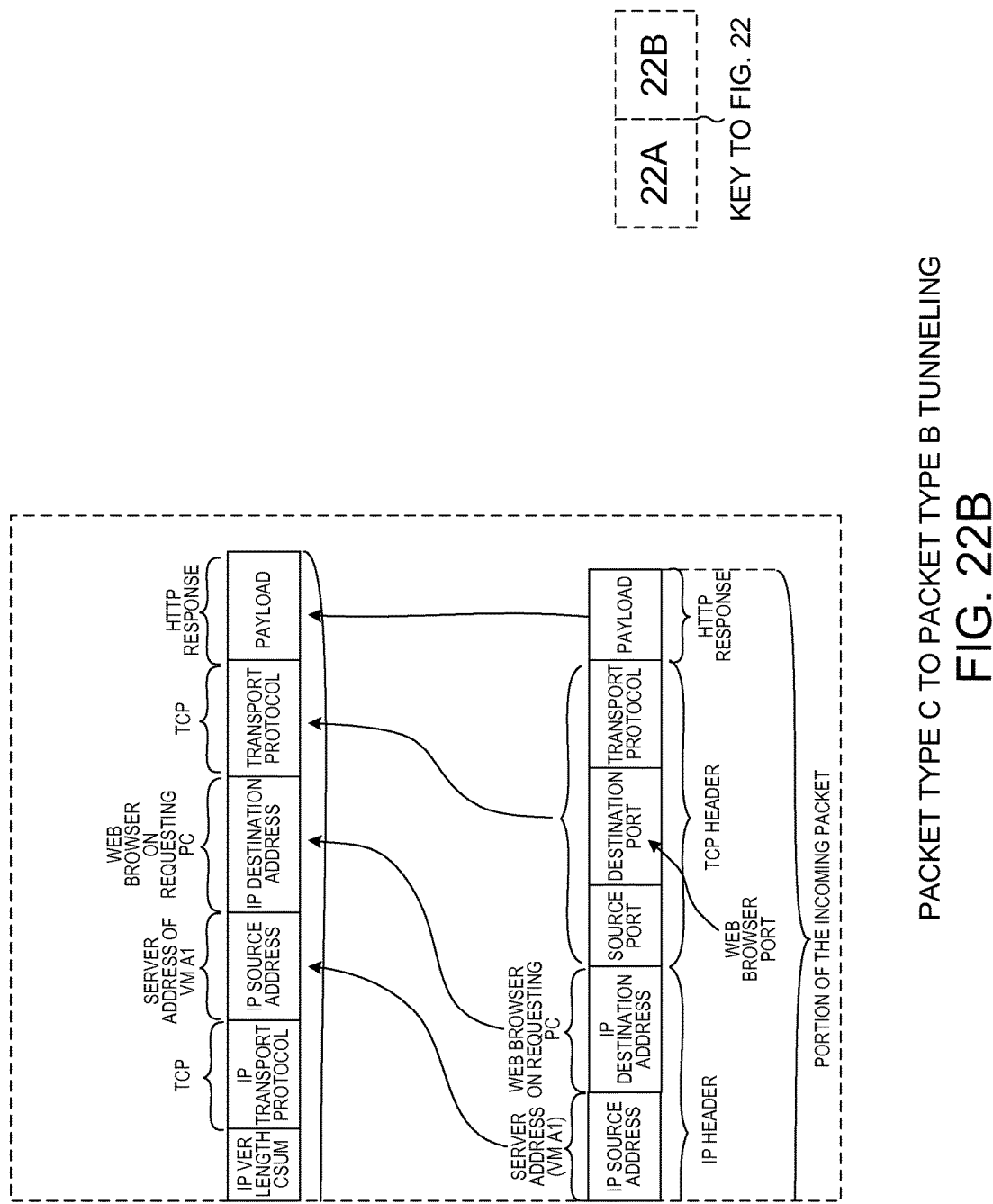
FIG. 22B is a diagram illustrating a conversion from a packet type C to a packet type B.

FIG. 21 illustrates a fourth scenario in which the Web server running on the virtual machine VM A1 running on host server device 22 generates a response and communicates the response from the virtual machine VM A1 to the SDN switch 21 as a packet type C communication. SDN switch 21 has to convert the packet type C communication to a packet type B communication in order to communicated data to gateway 20 through spine 16. The conversion from packet type C to a packet type B is illustrated in FIG. 22 (including FIG. 22A and FIG. 22B). The VLAN number is removed from the packet. The ethernet destination addresses changed from the leaf (SDN switch) ethernet address to the gateway ethernet address. The ethernet source address is changed from the server ethernet address to the leaf (SDN switch) ethernet address. A VXLAN header is also added to the packet. The VXLAN header includes: an ethernet destination address that is the ethernet addresses the spine 16, and the data source address that is the ethernet address of the leaf (SDN switch 16), and IP source address that is the IP address of the leaf (SDN switch 16), and ethernet transport protocol (e.g. IPV4), and IP version length checksum, and IP transport protocol (e.g. TCP), and IP destination address that is the IP address of the gateway 20, a transport protocol (e.g. UDP), and a VXLAN network ID (e.g. overlay network A).

Figure 23A:
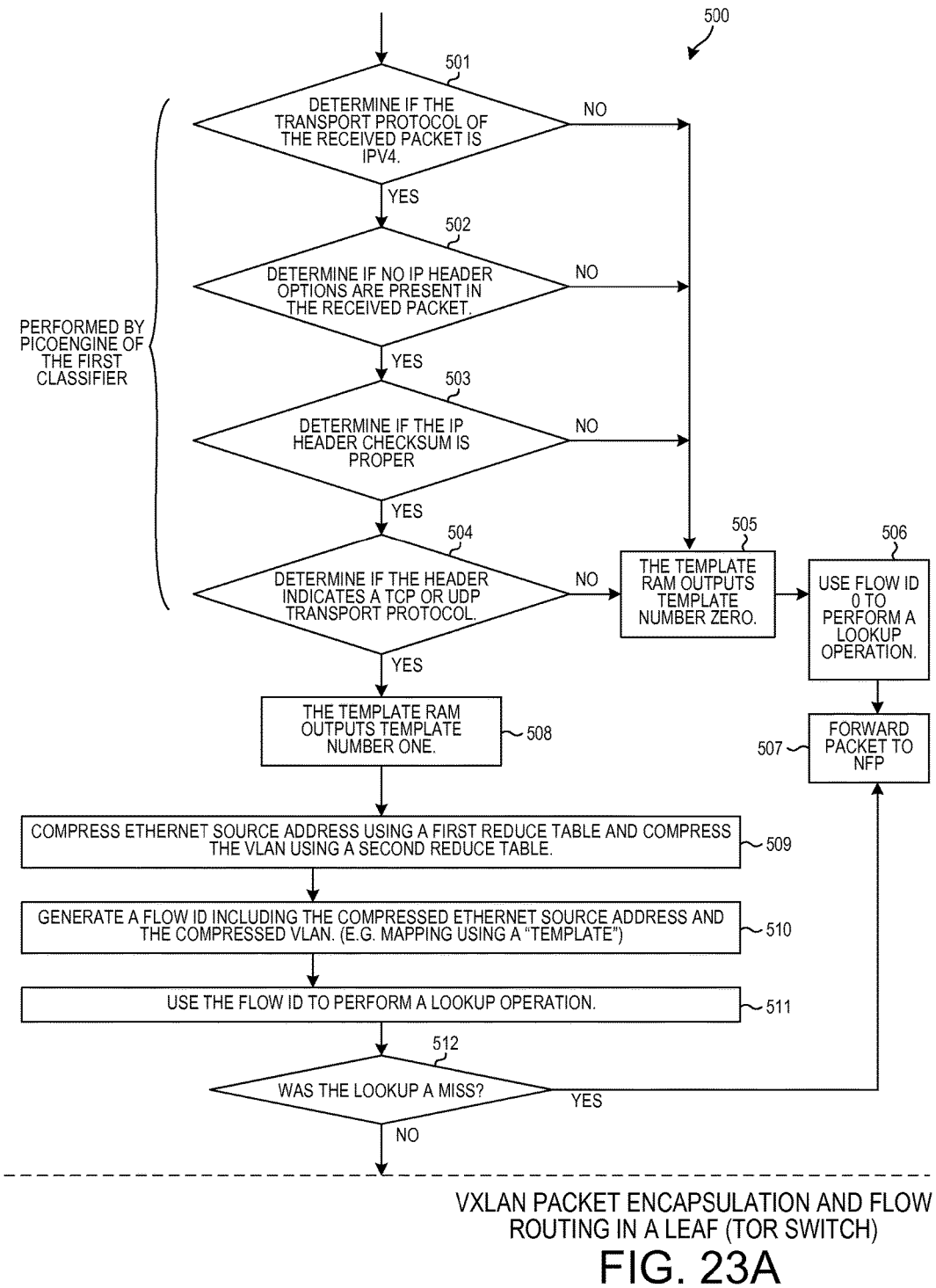
FIG. 23A is a flowchart illustrating the steps of VXLAN encapsulation and flow routing in a SDN switch (leaf).
Figure 23B:
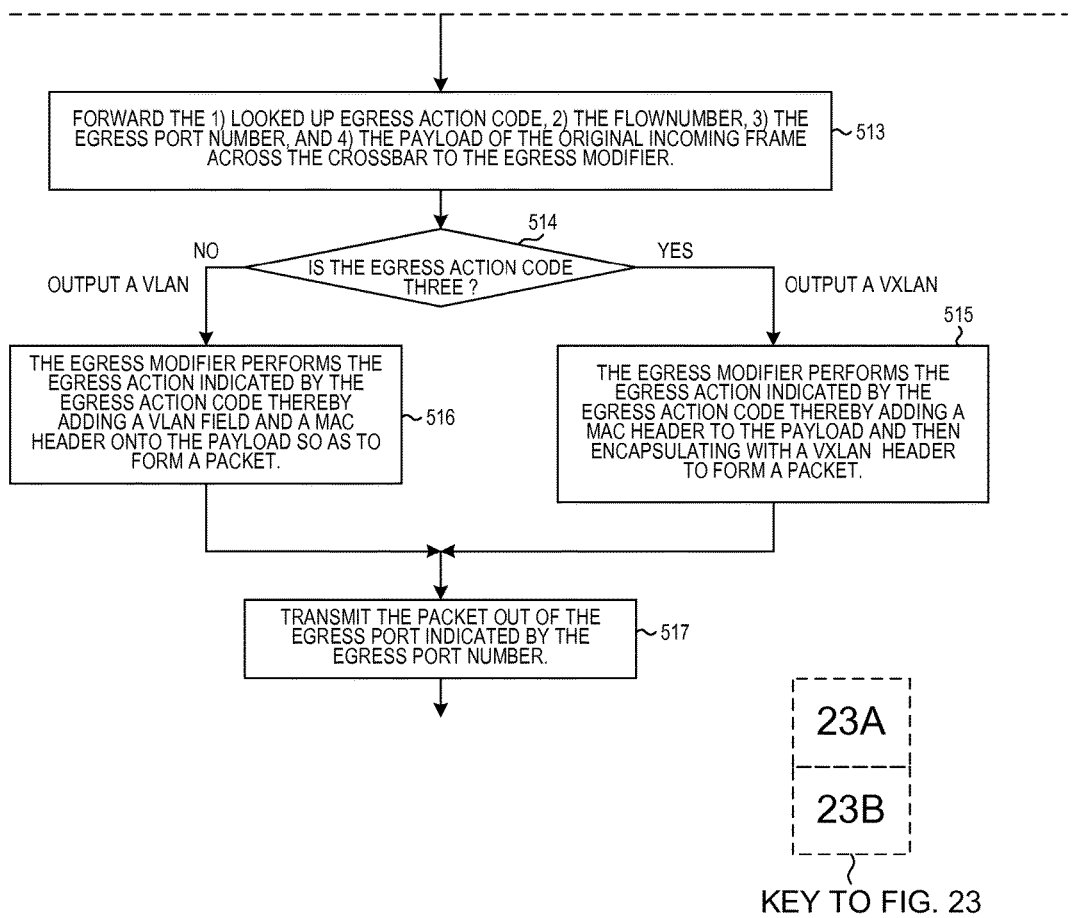
FIG. 23B is a flowchart illustrating the steps of VXLAN encapsulation and flow routing in a SDN switch (leaf).

FIG. 23 (including FIG. 23A and FIG. 23B) is a flowchart 500 illustrating VXLAN encapsulation flow routing in a leaf (SDN switch). In step 501, it is determined that the transfer protocol of the received packet is IPV4. If the packet is IPV4 the flow moves a step 502. In step 502 is determined if no IP header options are present in the received packet. If no IP header options are present in the received packet the flow moves to step 503. In step 503 it is determined that the IP header checksum is proper. If the IP header checksum is proper the flow moves a step 504. In step 504, it is determined that the header indicates a TCP or UDP transport protocol. If any of steps 501 through 504 are not met the flow moves to step 505. In step 505 the template ran outputs template number zero and the flow moves to step 506. In step 506, the flow ID 0 is used to perform a lookup operation and the flow moves to step 507. In step 507, the packet is forwarded to the NFP (where the NFP will determine how to route the packet). Returning to step 504 if the header does indicate a TCP or UDP transfer protocol the flow moves to step 508. In step 508 the template RAM outputs template number one. In step 509, the ethernet source address is compressed using a first reduce table and the VLAN is compressed using a second reduce table. In step 510, a flow ID including the compressed ethernet source address and the compressed VLAN is generated. This can be a accomplished by mapping using a template. In step 511, the flow ID is used for forming lookup operation. In step 512, it is determined if the lookup operation resulted in a mess or hit. If the lookup operation resulted in a miss then the flow moves to step 507 and the packet is forwarded NFP where the NFP will determine how to route the packet. If the lookup operation resulted in a hit then the flow moves to step 513. In step 513, the following four items are forwarded across the crossbar of the egress modifier: 1) the lookup egress action code; 2) the flow number; 3) the egress port number; and 4) the payload of the original incoming frame. In step 514, it is determined if the egress action code is three. If the egress action code is three the flow moves onto step 515. In step 515, the egress modifier performs egress action indicated by the egress action code thereby adding the MAC header to the payload and then encapsulating with a VXLAN header to form packet. In step 517, the packet is transmitted out of the egress port indicated by the egress port number. Going back to step 514, if the egress action code is not the three the flow moves to step 516. In step 516, the egress modifier performs egress action indicated by the egress action code thereby adding a VLAN field and a MAC header onto the payloads so as to form a packet. Then the flow moves to step 517, wherein the packet is transmitted out of the egress port indicated by the egress port number. It is noted that in one example steps 501 through 504 are performed by the pico-engine included in CCT circuit 115.

Figure 32:
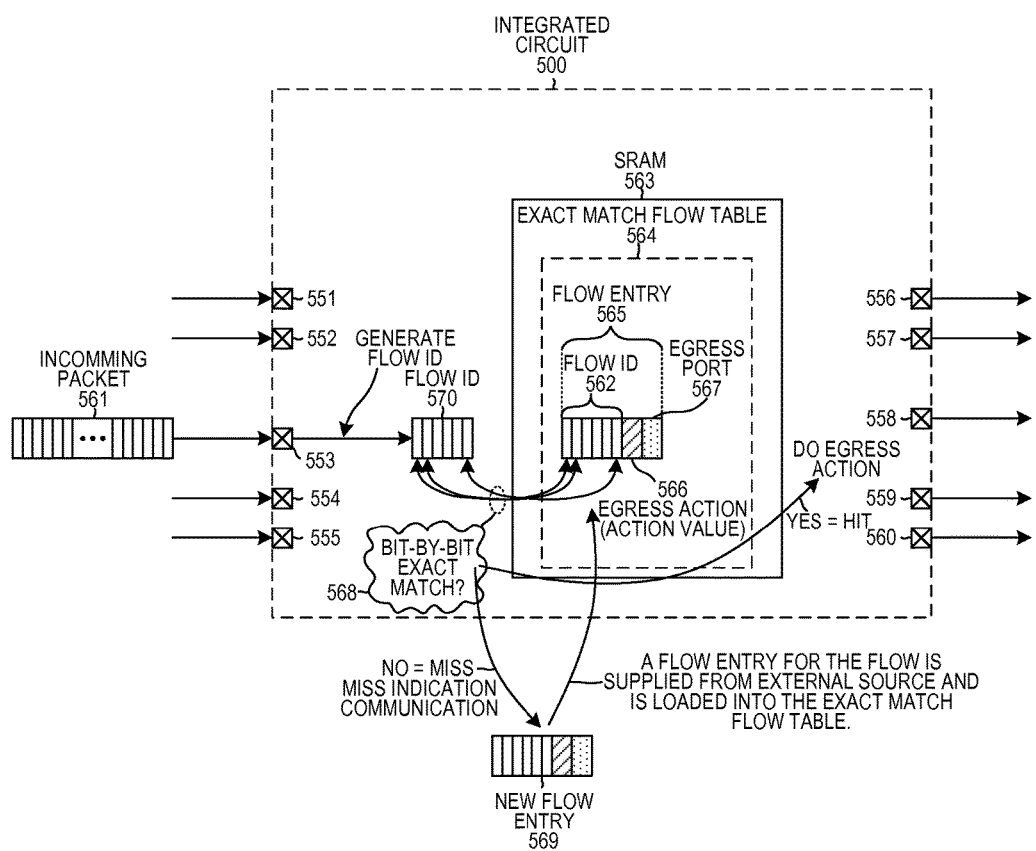
FIG. 32 is a diagram illustrating a bit-by-bit match using an exact-match flow table.

FIG. 32 illustrates a first bit-by-bit exact-match using an exact-match flow table. Integrated circuit 500 includes a plurality of QSFP 40 Gbps modules 551-560, a bit-by-bit exact-match logic block 568, and an SRAM 563. SRAM 563 includes an exact-match flow table 564 that stores multiple flow entries such as flow entry 565. Each flow entry includes a flow ID 562, an egress action 566, and egress port 567. In operation and incoming packet 561 is received by the integrated circuit 500 via module 553. In response to receiving incoming packet 561, integrated circuit 500 generates a flow ID 570. Integrated circuit 500 compares the generated flow ID 570 with flow ID 562 included in flow entry 565 using the bit-by-bit exact-match logic 568. In a first scenario it is determined that the flow ID 570 matches flow ID 562 in which case integrated circuit 500 performs the egress action and communicates the incoming packet out of the appropriate egress port. In a second scenario it is determined that the flow ID 570 does not match flow ID 562 in which case integrated circuit 500 sends the incoming packet 561 to an external device that generates a new flow entry 569 that is communicated back to integrated circuit 500 and loaded into the exact-match flow table 564 stored in SRAM 563.

Figure 33:
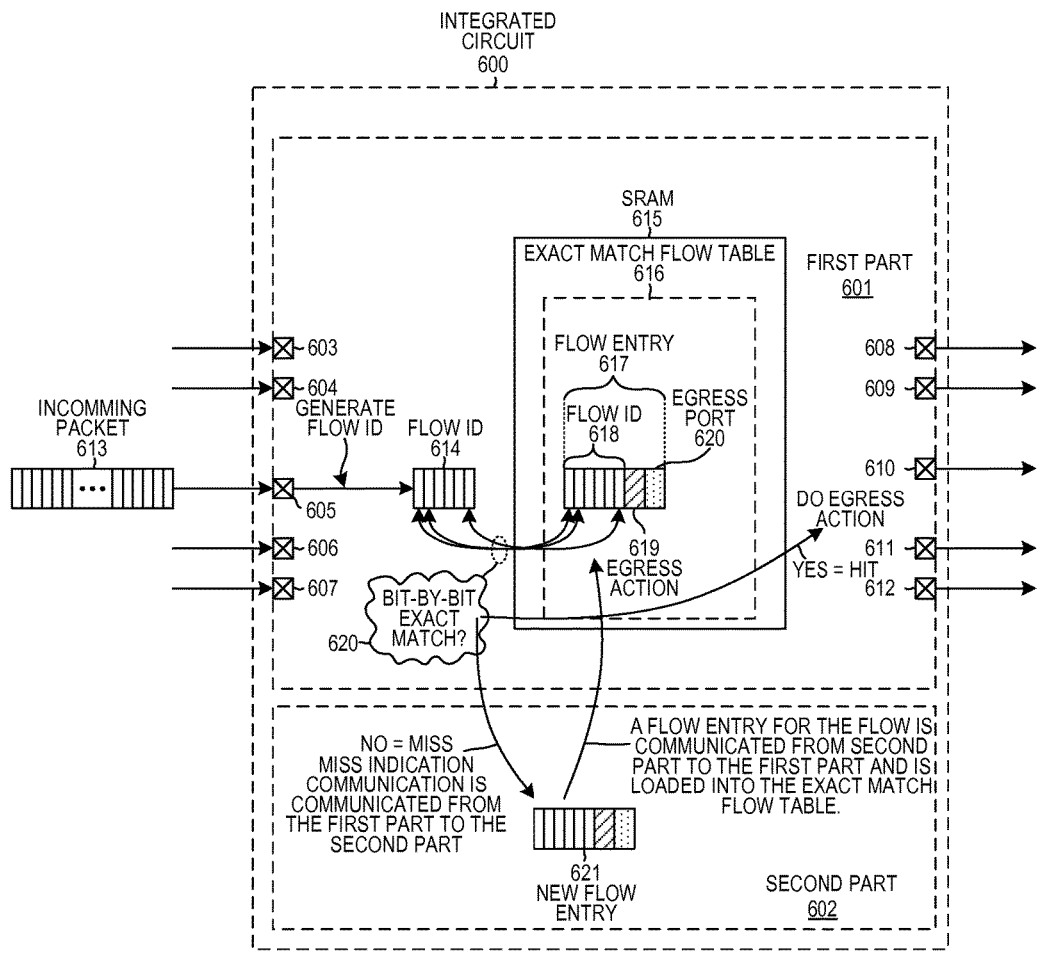
FIG. 33 is a diagram illustrating a bit-by-bit match using an exact-match flow table on a single integrated circuit.

FIG. 33 illustrates a second bit-by-bit exact-match using an exact-match flow table. Integrated circuit 600 includes a first part of the integrated circuit 601 and a second part of integrated circuit 602. In one example, each party referred to as a separate island in a multi-island architecture. The first part 601 of integrated circuit 600 includes plurality of QSFP 40 Gbps modules 603-612, a bit-by-bit exact-match logic block 620, and an SRAM 615. SRAM 615 includes an exact-match flow table 616 that stores multiple flow entries such as flow entry 617. Each flow entry includes a flow ID 618, an egress action 619, and egress port 620. In operation and incoming packet 613 is received by the first part 601 of integrated circuit 600 via module 605. In response to receiving incoming packet 613, the first part 601 of integrated circuit 600 generates a flow ID 614. The first part 601 of integrated circuit 600 compares the generated flow ID 614 with flow ID 618 included in flow entry 617 using the bit-by-bit exact-match logic 620. In a first scenario it is determined that the flow ID 614 matches flow ID 618 in which case the first part 601 of integrated circuit 600 performs the egress action and communicates the incoming packet out of the appropriate egress port. In a second scenario it is determined that the flow ID 614 does not match flow ID 617 in which case the first part 601 of integrated circuit 600 sends the incoming packet 613 to the second part 602 of integrated circuit 600 that generates a new flow entry 621 that is communicated back to the first part 601 of integrated circuit 600 and is loaded into the exact-match flow table 616 stored in SRAM 615.

In accordance with one novel aspect, an ingress network port of an NFX circuit can operate in one of two modes: a data mode, or a novel command mode. In the data mode, an incoming packet is handled as set forth above in that the packet is characterized and classified and then switched in accordance a flow entry in the flow table of the corner portion. If there is a miss, then the packet is automatically forwarded to the NFP circuit so that the NFP circuit can determine how the packet will be switched out of the SDN switch. A packet includes a MAC preamble and start frame delimiter, a MAC header portion, a MAC payload portion, and a MAC CRC portion. The ingress MAC circuitry 114 of FIG. 5 detects the MAC preamble and uses the MAC CRC to check that the intervening bits were properly received, but the ingress MAC circuitry 114 does not otherwise use the intervening bits. All the network ports of the NFX circuits that receive external network traffic onto the SDN switch and/or that output network traffic out of the SDN switch (i.e., do not link to another NFX circuit) operate in this data mode.

Figure 37:
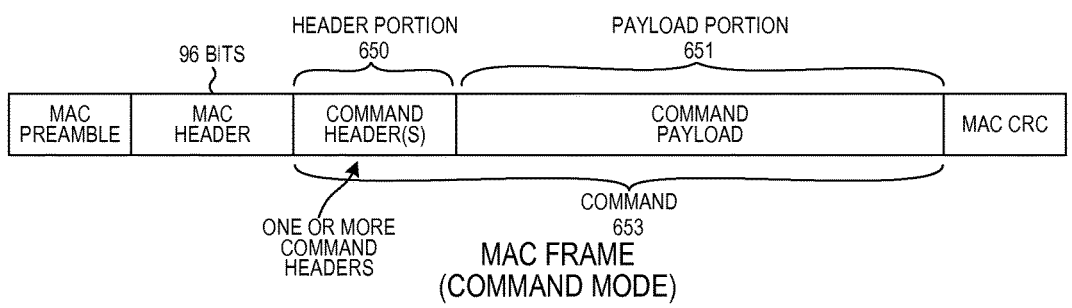
FIG. 37 is a diagram of a MAC frame, such as a MAC frame received onto an NFX port, when the port is operating in the command mode.
Figure 38:
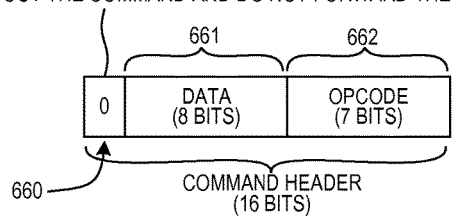
FIG. 38 is a diagram that illustrates the format of one of the command headers in the command of the MAC frame of FIG. 37.

In the novel command mode, the ingress network port receives a packet of the same form, but as illustrated in FIG. 37 the packet may contain a special command 653. The packet (MAC frame) passes through the same ingress MAC circuitry 114, but the subsequent CCT circuit 115 interprets the MAC payload portion of the frame to be a special command. The command 653 includes header portion 650 (containing one or more command headers) and a payload portion 651. FIG. 38 is a diagram that illustrates the form of one command header. The command header has a leading bit 660, followed by an 8-bit data portion 661, followed by a 7-bit opcode portion 662. If the leading bit 660 of the first command header (first command header of the header(s) portion 650) is a "0", then the command is a command to be carried out by receiving NFX circuit. There is one and only one command header. If, however, the leading bit 660 of the first command header (first command header of the header(s) portion 650) is a "1", then the receiving NFX circuit is to strip the leading command header from the packet, and to forward the remainder of the packet (in the form of the MAC frame, without the removed command header) on to another NFX circuit as indicated by the data portion of the command header. In this way, a command can be forwarded from one NFX circuit to the next, with each forwarding NFX circuit popping off and removing the leading command header. The last command header will have a leading bit of "0", so that the NFX circuit that receives this command detects this "0" and carries out the operation specified by the opcode portion of the command. The operation may, for example, be to add a flow entry into an NFX flow table. The operation may, for example, be to delete a flow entry from an NFX flow table. The operation may, for example, be to output a packet carried by the payload onto a particular egress port of the NFX circuit. Once the NFX circuits of the SDN switch are powered up and are properly set up by the NFP circuit, all the network ports of the NFX circuits that couple directly to other NFX circuits are made to operate in this command mode. Intercommunication between NFX circuits uses this command mode.

FIG. 39 is a table that sets forth the operations specified by the various opcodes that may be present in a command. An opcode of "0000000" indicates that the receiving NFX circuit should strip the leading command header, and forward the resulting packet out of the corner portion and egress port identified by the data portion of the command header. The payload of the original incoming command is therefore forwarded out of the NFX as the payload of the outgoing command, the difference between the two commands being that the outgoing command has one fewer command header (the leading command header of the incoming command is removed to make the outgoing command). An entire packet (for example, a packet received onto the SDN switch that resulted in a "miss" in the receiving NFX circuit) can be forwarded through an NFX circuit using this command, by including the packet as the payload portion of the command.

An opcode of "0000100" is an instruction to add a flow entry, where the payload of the packet is the flow entry to be added.

An opcode of "0000101" is an instruction to delete a flow entry, where the payload of the packet identifies the particular flow entry to be deleted by its flow ID. The classifier that carries out the operations of the add flow entry opcode and the delete flow entry opcodes by using connections 141 and 142 (see FIG. 5) to communicate with and control the flow table structure 121 so that the flow table 90 is changed as indicated by the command.

An opcode of "0000110" is an instruction to report status or statistics for a flow, where the particular flow ID identifying the flow is set forth in the payload of the command. Such status may, for example, be the total number of packets of this flow that have been received, and the total number of bytes that have been received of this flow. This statistics information is maintained as part of the flow entry for the flow ID of the flow. The statistics are reported by the NFX sending a command packet back to the NFP circuit. The command packet that is sent back carries the statistics information. To form this command packet, the called for statistics information from the flow table 90 is supplied by connection 143 from the flow table structure 121 to the buffer SRAM block 126 where the command packet to be output is formed, and in this way the statistics information is made part of the outgoing command packet. The classifier that carries out the statistics operation as called for by the opcode forms the remainder of the packet complete with its command headers, and loads that part of the command packet via connections 144 into the buffer SRAM block 126.

An opcode of "0000111" is a "modeset" instruction to set a particular port on the NFX circuit to begin operating in the command mode, where the particular NFX port is given by the content of the data portion of the command.

An opcode of "0001000" is an instruction to: (i) configure a particular MAC circuit 114 or 129; (ii) load reduce SRAM of reduce tables 224 and 225; and (iii) load one of the memories included in the egress modifier circuit 147. The configuration data to be loaded into the MAC circuit is carried in the payload of the command, and where the particular MAC circuit to be configured is set forth in the data portion of the command. In this way, the speed of the MAC ports, the width of the MAC ports, and the power levels of the MAC ports can be configured. Connections 139 and 140 shown in FIG. 5 are used to communicate the configuration data from the classifier (that carries out the "000100" opcode) to the ingress MAC circuit to be configured.

Consider, for example, a situation in which the NFP circuit 53 needs to add a flow entry into the flow table 105 of NFX circuit 52. Note that NFP circuit 53 is not directly coupled by a single network connection or link to NFX 52, but rather there is an intervening NFX circuit (either NFX 50 or NFX 49). Assume for purposes of this example that the ingress portion of the A1 network port of NFX circuit 50 is in the command mode, and further assume that the ingress portion of the A1 network port of NFX circuit 52 is in the command mode. The NFP circuit 53 generates a MAC frame that contains a special command of the type set forth in FIG. 35, where there are two command headers, and where the payload portion of the frame is the flow entry to be added. The leading command header of the MAC frame is an instruction to the receiving NFX circuit to forward the packet out of its egress port C3 after stripping the leading command header. The second command header has an opcode of "0000100" and is an instruction to the receiving NFX circuit, in this case NFX circuit 52, to add the flow entry carried in the payload portion of the frame into the flow table 105 as indicated by the data portion of the command header. This MAC frame, with the two command headers, is output from network port 88 of the NFP circuit 53 in ordinary fashion as an ordinary MAC frame. The ingress portion of the A1 network port of NFX 50, however, receives the MAC frame and because the ingress portion is in the command made, the ingress portion interprets the leading command header, and in accordance with the leading command header forwards the remainder of the MAC frame out of network port C3. Which port to output the MAC frame from is indicated by the data portion of the leading command header. The resulting MAC frame at this point has only one command header, and this MAC frame with one command header is received onto the A1 port of NFX circuit 52. Because the ingress portion of the A1 network port is operating in the command mode, the command header is interpreted. This command header has an opcode of "0000100", so the flow entry contained in the payload of the MAC frame is added to the flow table 105. Because the NFP circuit 53 stores information about the configuration and interconnectivity of the fabric of NFX switches, the NFP circuit 53 can generate a MAC frame with the appropriate command headers such that a desired command is supplied to the desired NFX circuit, even if the NFP is not directly coupled to the NFX circuit to which the ultimate command is directed. In this way, using such commands, the NFP circuit 53 controls the content of the flow tables of the NFX circuits and controls the operating mode of each NFX port. The NFP can cause a command packet to be sent to any one of the NFX circuits, where the command is an instruction to output the payload of the command in the form of a packet onto any one of the egress ports of the NFX circuit, and where the packet as output onto the egress port is actually a command packet itself.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated circuit comprising:
   an input port through which an incoming packet is received onto the integrated circuit;
   a first Characterize/Classify/Table Lookup and Mux Circuit (CCTC) comprising:
      a first characterizer coupled to receive at least part of the incoming packet;
      a first classifier coupled to receive a characterization output value from the first characterizer; and
      a first Table Lookup and Multiplexer Circuit (TLMC) coupled to receive a data output value from the first classifier and to receive a control information value from the first classifier, wherein a programmable lookup circuit of the first TLMC is controllable to receive a selectable part of the data output value received from the first classifier and to output an associated lookup value, and wherein a multiplexer circuit of the first TLMC is controllable to output the lookup value as a part of a data output value that is output by the first TLMC;
   a second CCTC comprising:
      a second characterizer coupled to receive at least a part of the data output value that is output by the first TLMC;
      a second classifier coupled to receive a characterization output value from the second characterizer; and
      a second TLMC coupled to receive the data output value from the second classifier and to receive a control information value from the second classifier, wherein a programmable lookup circuit of the second TLMC is controllable to receive a selectable part of the data output value received from the second classifier and to output an associated lookup value, and wherein a multiplexer circuit of the second TLMC is controllable to output the lookup value as a part of a Flow Identification value (Flow Id) that is output by the second TLMC; and
   an exact-match flow table structure coupled to receive the Flow ID that is output by the second TLMC, wherein the exact-match flow table structure maintains an exact-match flow table, wherein the exact-match flow table comprises a plurality of flow entries, wherein each flow entry comprises a Flow ID and an action value, and wherein the exact-match flow table structure determines, for each Flow ID received from the multiplexer circuit of the second TLMC, whether the Flow ID is an exact bit-by-bit match for any Flow ID of any flow entry stored in the exact-match flow table.

2. The integrated circuit of claim 1, wherein the second CCTC is substantially structurally identical to the first CCTC.

3. The integrated circuit of claim 2, wherein the characterization output value output indicates that the incoming packet meets each of a plurality of characterization criteria.

4. The integrated circuit of claim 2, wherein the incoming packet is of one packet type of a plurality of packet types, and wherein the characterization output value is indicative of the one packet type.

5. The integrated circuit of claim 2, wherein the first characterizer is an amount of combinatorial digital logic and does not include any processor that fetches and executes any instructions.

6. The integrated circuit of claim 2, wherein the control information value output by the first classifier determines which one of a plurality of lookup operations will be performed by the programmable lookup circuit of the first TLMC and also determines a select value supplied onto select input leads of the multiplexer circuit of the first TLMC.

7. The integrated circuit of claim 2, wherein the multiplexer circuit of the first TLMC comprises a plurality of byte-wide multiplexers.

8. The integrated circuit of claim 2, wherein the data output value that is output by the first TLMC comprises a plurality of bytes, wherein the multiplexer circuit of the first TLMC comprises a plurality of byte-wide multiplexers, and wherein each respective one of the byte-wide multiplexers outputs a corresponding one of the bytes of the data output value.

9. The integrated circuit of claim 2, wherein the first TLMC does not include any processor that fetches instructions.

10. The integrated circuit of claim 2, wherein the selectable part of the data output value received by the table lookup circuit of the first TLMC from the first classifier has a first number of bits, wherein the associated lookup value output by the table lookup circuit of the first TLMC has a second number of bits, and wherein the second number is bits is smaller than the first number of bits.

11. The integrated circuit of claim 2, wherein no flow entry stored in the exact-match flow table includes any wildcard indicator.

12. The integrated circuit of claim 2, wherein the exact-match flow table structure does not and cannot store a Flow ID having any wildcard indictor.

13. The integrated circuit of claim 2, wherein the CCTC is controllable to receive the data output value that is output by the first TLMC and to forward that data output value as the Flow ID to the exact-match flow table structure.

14. An integrated circuit comprising:
   an input port through which an incoming packet is received onto the integrated circuit;
   a first Characterize/Classify/Table Lookup and Mux Circuit (CCTC) comprising:
      a first characterizer that receives at least part of the incoming packet, wherein the first characterizer outputs a characterization output value that indicates whether the incoming packet meets each of a plurality of characterization criteria;
      a first classifier coupled to receive the characterization output value from the first characterizer; and
      a first Table Lookup and Multiplexer Circuit (TLMC) coupled to receive a data output value from the first classifier and to receive a control information value from the first classifier, wherein a programmable lookup circuit of the first TLMC is controllable to receive a selectable part of the data output value received from the first classifier and to output an associated lookup value, and wherein a multiplexer circuit of the first TLMC is controllable to output the lookup value as a part of a data output value that is output by the first TLMC;

a second CCTC comprising:
- a second characterizer coupled to receive at least a part of the data output value that is output by the first TLMC;
- a second classifier coupled to receive a characterization output value from the second characterizer; and
- a second TLMC coupled to receive the data output value from the second classifier and to receive a control information value from the second classifier, wherein a programmable lookup circuit of the second TLMC is controllable to receive a selectable part of the data output value received from the second classifier and to output an associated lookup value, and wherein a multiplexer circuit of the first TLMC is controllable to output the lookup value as a part of a Flow Identification value (Flow Id) that is output by the second TLMC; and a flow table structure coupled to receive the Flow ID that is output by the second TLMC, wherein the flow table structure maintains a flow table, wherein the flow table comprises a plurality of flow entries.

15. The integrated circuit of claim 14, wherein the second CCTC is substantially structurally identical to the first CCTC.

16. A method comprising:
(a) maintaining a flow table on an integrated circuit, wherein the flow table comprises a plurality of flow entries, wherein each flow entry includes a value;
(b) receiving a packet onto an integrated circuit;
(c) receiving packet data of the packet onto a first Characterize/Classify/Table Lookup and Mux Circuit (CCTC);
(d) determining that the packet data is of one type of a plurality of types, wherein the determining of (d) is performed by a first part of the first CCTC;
(e) generating a first output data value by concatenating certain fields of the packet data in one selected way so as to form the first output data value, wherein the one selected way is one of a plurality of selectable ways, wherein the one selected way is determined by the one type determined in (d), wherein the generating of (e) is performed by a second part of the first CCTC;
(f) receiving the first output data value from the second part of the first CCTC onto a second CCTC, wherein the second CCTC is substantially structurally identical to the first CCTC, wherein the first output data value from the second part of the first CCTC is received onto a first part of the second CCTC;
(g) determining that the first output data value is of one type of a plurality of types, wherein the determining of (g) is performed by the first part of the second CCTC;
(h) generating a second output data value by concatenating certain fields of the first output data in one selected way so as to form the second output data value, wherein the one selected way is one of a plurality of selectable ways, wherein the one selected way is determined by the one type determined in (g), wherein the generating of (h) is performed by a second part of the second CCTC; and
(i) determining whether the second output data matches any value of any flow entry of the flow table, wherein (a) through (i) are performed by the integrated circuit.

17. The method of claim 16, wherein the one of the plurality of selected ways involves: 1) supplying a selected field of the data packet to a programmable lookup circuit so that the programmable lookup circuit outputs an associated lookup value, and 2) incorporating at least a part of the associated lookup value into the first output data value that is output by the second part of the first CCTC.

18. The method of claim 16, wherein the flow table is stored in a Static Random Access Memory (SRAM), and wherein the SRAM is a part of the integrated circuit.

19. The method of claim 18, wherein the flow table is an exact-match flow table, and wherein the integrated circuit does not store an Open Flow flow table.

20. The method of claim 16, wherein (d) involves supplying the packet data to an amount of combinatorial digital logic and then analyzing output values from the combinatorial digital logic using a processor.

21. The method of claim 16, wherein the one of the plurality of selectable ways in (e) involves incorporating certain fields of the packet data into the first output data value such that at least one other field of the packet data is not incorporated into the first output data value.

* * * * *